United States Patent
Lim et al.

(10) Patent No.: US 10,554,635 B2
(45) Date of Patent: *Feb. 4, 2020

(54) PROTECTING DOCUMENTS USING POLICIES AND ENCRYPTION

(71) Applicant: NextLabs, Inc., San Mateo, CA (US)

(72) Inventors: Keng Lim, Atherton, CA (US); Poon Fung, Cupertino, CA (US); Andrew Han, San Francisco, CA (US)

(73) Assignee: NextLabs, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,664

(22) Filed: May 1, 2018

(65) Prior Publication Data

US 2018/0248855 A1    Aug. 30, 2018

Related U.S. Application Data

(63) Continuation of application No. 15/232,088, filed on Aug. 9, 2016, now Pat. No. 9,961,049, which is a
(Continued)

(51) Int. Cl.
*H04L 9/00* (2006.01)
*G06F 21/00* (2013.01)
(Continued)

(52) U.S. Cl.
CPC ........ *H04L 63/0428* (2013.01); *G06F 21/602* (2013.01); *G06F 21/606* (2013.01); *G06F 21/6218* (2013.01); *H04L 9/083* (2013.01); *H04L 9/0822* (2013.01); *H04L 51/08* (2013.01); *H04L 63/0457* (2013.01);
(Continued)

(58) Field of Classification Search
CPC ..... H04L 63/20; H04L 51/12; H04L 63/0227; H04L 51/34; H04L 63/0428; H04L 12/585; G06F 21/60; G06F 21/6209; G06F 21/6218
See application file for complete search history.

(56) References Cited

U.S. PATENT DOCUMENTS

| 5,799,083 A | 8/1998 | Brothers et al. |
| 6,393,568 B1 | 5/2002 | Ranger et al. |
| (Continued) | | |

FOREIGN PATENT DOCUMENTS

| WO | 03-028026 A1 | 4/2003 |
| WO | 2007-115332 A2 | 10/2007 |

OTHER PUBLICATIONS

Wolthusen, S.D., "Security Policy Enforcement at the File System Level in the Windows NT Operating System Family," Proceedings 17th Annual Computer Security Applications Conference (ACSAC), Dec. 10-14, 2001, New Orleans, LA, IEEE, Piscataway, NJ, pp. 55-63, XP010584888, ISBN: 978-0-7695-1405-5.
(Continued)

*Primary Examiner* — Alexander Lagor
(74) *Attorney, Agent, or Firm* — Aka Chan LLP

(57) ABSTRACT

A system protects documents at rest and in motion using declarative policies and encryption. A document at rest includes documents on a device such as the hard drive of a computer. A document in motion is a document that is passing through a policy enforcement point. The policy enforcement point can be a server (e.g., mail server, instant messenger server, file server, or network connection server).

18 Claims, 19 Drawing Sheets

Related U.S. Application Data continuation of application No. 14/748,115, filed on Jun. 23, 2015, now Pat. No. 9,413,771, which is a continuation of application No. 13/193,588, filed on Jul. 28, 2011, now Pat. No. 9,064,131.

(60) Provisional application No. 61/368,408, filed on Jul. 28, 2010.

(51) Int. Cl.
*G06F 21/60* (2013.01)
*G06F 21/62* (2013.01)
*H04L 29/06* (2006.01)
*H04L 9/08* (2006.01)
*H04L 12/58* (2006.01)

(52) U.S. Cl.
CPC ............ *H04L 63/06* (2013.01); *H04L 63/107* (2013.01); *H04L 63/20* (2013.01); *H04L 67/42* (2013.01); *H04L 2209/60* (2013.01)

(56) References Cited

U.S. PATENT DOCUMENTS

| 8,065,713 | B1 | 11/2011 | Vainstein et al. |
| 2002/0141578 | A1 | 10/2002 | Ripley |
| 2004/0010701 | A1 | 1/2004 | Umebayashi et al. |
| 2005/0140964 | A1 | 6/2005 | Eschenauer et al. |
| 2006/0168012 | A1 | 7/2006 | Rose et al. |
| 2007/0156670 | A1 | 7/2007 | Lim |
| 2007/0195776 | A1 | 8/2007 | Zheng et al. |
| 2008/0247548 | A1 | 10/2008 | Kato |
| 2009/0307745 | A1 | 12/2009 | Inose |
| 2010/0017882 | A1 | 1/2010 | Chou |
| 2010/0125891 | A1 | 5/2010 | Baskaran |
| 2010/0146582 | A1 | 6/2010 | Jaber et al. |

OTHER PUBLICATIONS

Graf, F., et al., "A Capability-Based Transparent Cryptographic File System," 2005 International Conference on Cyberworlds, IEEE Computer Society of Los Alamitos, CA, IEEE, Nov. 23, 2005, pp. 101-108, XP010889368, ISBN: 978-0-7695-2378-1.

Tang, Q., "On Using Encryption Techniques to Enhance Sticky Policies Enforcement," University of Twente Publications, Dec. 5, 2008, XP055096504, NL, retrieved from the Internet Jan. 15, 2014: URL:http//doc.utwente.nl/65155/1/On_Using_Encryption_Techniques_to_Enhance_Sticky_Policies_Enforcement.pdf.

Sabrina De Capitani Di Vimercati, et al., "Over-Encryption: Management of Access Control Evolution on Outsourced Data," Proceedings of the 33rd International Conference on Very Large Data Bases VLDB'07, Sep. 27, 2007, XP055096420, retrieved from the Internet Jan. 14, 2014: URL:http//www.vldb.org/conf/2007/papers/research/p123-decapitani.pdf.

PROTECTING DOCUMENTS USING POLICIES AND ENCRYPTION

CROSS-REFERENCE TO RELATED APPLICATIONS

This patent application is a continuation of U.S. patent application Ser. No. 15/232,088, filed Aug. 9, 2016, issued as U.S. Pat. No. 9,961,049, on May 1, 2018, which is a continuation of U.S. patent application Ser. No. 14/748,115, filed Jun. 23, 2015, issued as U.S. Pat. No. 9,413,771 on Aug. 9, 2016, which is a continuation of U.S. patent application Ser. No. 13/193,588, filed Jul. 28, 2011, issued as U.S. Pat. No. 9,064,131 on Jun. 23, 2015, which claims the benefit of U.S. patent application 61/368,408, filed Jul. 28, 2010. These applications are incorporated by reference along with all other references cited in this application.

DESCRIPTION

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to the field of information and document management, and more specifically, to protecting documents at rest and in motion using declarative policies and encryption.

Controlling access to a document is typically the role of an operating system. Modern operating systems provide rudimentary access control mechanisms such as file system attributes or access control lists (ACL) which limit access to a file on a file system directly attached to the host of the operating system. When a computer is connected to a network, the task of protecting documents on a computer becomes more complicated. To protect data on a networked computer, consideration is given to protecting data-at-rest (e.g., data stored on a storage device), data-in-motion (e.g., data being transmitted but has not reached its destination), and discrepancies introduced by a heterogeneous operating environment (e.g., different capabilities and limitations of operating systems and file systems). As more users have access to data stored on a networked computer, more sophisticated access and usage control may be desired.

Document management systems provide additional control and protection to documents especially on a computer network. A document management system may require a document to be checked in to a document management repository in order to be protected. To read or change a document in a document management repository, a user may check out a document from a document management repository. Once a document is checked out, protection offered by a document management system may cease. As a result, protection offered by a document management system may be limited to documents residing in a document management repository but not copies of the documents retrieved from a document management repository.

To keep data protected at all times, encryption may be applied before a document is stored or transmitted. While encryption's ability to protect information is desirable, common encryption techniques have their share of shortcomings. For example, most encryption algorithms are computationally expensive and encrypting a large document can be time consuming. Moreover, managing the encryption keys of a large number of documents, securing encryption keys, and keeping encryption keys available all the times can be very complicated.

A popular application of encryption is an encrypted file system. In an attempt to address a limitation of operating system-based access control where files on a storage device are left unprotected when an operating system is disabled (or bypassed) or a storage device is removed from a host computer, many modern operation systems support file system encryption. On an encrypted file system, either all or selected files are encrypted before saving the files to a storage device (e.g., hard disk or Flash drive). Encryption keys used to encrypt files are managed by an operating system, whereby encryption and decryption of files are largely transparent to users. While an encrypted file system is desirable for some applications, files on an encrypted file system may become unprotected when they are copied or moved from the encrypted file system. For example, if a user copies a file from an encrypted file system to a file system that does not support file encryption, the copy of the file at the destination is left unprotected. Further, an encrypted file system does not protect data-in-motion (e.g., when a file on a file server is opened by a client computer on the network) and an encrypted network protocol must be used to protect the content of a file being transmitted.

Some application programs offer document encryption via a proprietary encrypted document format (e.g., Microsoft Word®, Microsoft Excel®, Adobe Acrobat®). While application specific encryption offers a convenient, easy to deploy document protection solution, such a solution may be difficult to manage as it lacks a sophisticated encryption key management infrastructure. For example, an application specific encryption solution may require a user to save a document in an encrypted format explicitly and maintain a password to open the document at a later time. This makes document protection not transparent to a user. In addition, application specific encryption is application specific, so it cannot be applied to protect other documents not associated with a specific application program.

Another popular use of encryption can be found in digital rights management (DRM) solutions. Unlike a document management system which is designed to protect source (or original) documents, DRM is designed specifically to protect renditions (or derivatives) of a source document in distribution. Common DRM solutions have licensing information embedded in a document being distributed, and rely on a custom reader (or player) or custom application plug-in to control access, limit rights assigned to a particular user or a particular distribution (e.g., do not allow access to content after it expires, do not allow copying content to clipboard, or do not allow printing of content), and track usage. DRM solutions are designed to protect renditions of a document in distribution where a rendition does not change after it is produced. In contrast, enterprise information management solutions can manage frequently changing documents along with frequently changing access and usage rights to the documents. As a result, DRM solutions designed to protect documents in distribution may not work well in managing source documents in an enterprise. Another shortcoming of DRM solutions is that DRM solutions may not protect documents that are not encrypted.

It would be advantageous for an information management system to offer the benefits of a sophisticated policy-based document access and usage control and fulltime content protection offer by encryption. It would further be advantageous to perform encryption and decryption automatically without user intervention. It would also be advantageous to encrypt confidential documents at rest and in motion. It would also be advantageous to associate encryption service with a policy enforcer of an information management system so that documents being encrypted are portable across operating systems and file systems. It would also be advantageous to have an encrypted document that is not application program dependent. It would also be advantageous to have an encryption service transparent to application programs (such as Microsoft Word®) so that a custom application is not required to read an encrypted document. It would also be advantageous to protect documents in place without requiring a user to check-in or check-out a document from a document management repository.

BRIEF SUMMARY OF THE INVENTION

A technique and system of the invention for encrypting and decrypting data using policies is implemented. The present invention describes methods, techniques, and systems encrypt and decrypt data based on or in conjunction with a policy enforcer.

In an implementation of the invention, a method of the invention uses a shared key ring. A policy enforcer maintains one or more shared key rings where each shared key ring contains one or more keys. Raw data files may be encrypted with the newest key in a key ring by default. To share a document, key encryption data portion is reencrypted with a shared key (Ksh), and the name of a shared key ring along with a key identifier are stored with the encrypted document.

In an implementation of the invention, a method of the invention uses sharing in-place. An encrypted document is stored on a file server accessible from two different domains. To share a document, the key data portion of the document is reencrypted using a shared key Ksh. To stop sharing, the key data portion of the document is reencrypted using a domain key Kd.

In an implementation of the invention, a method of the invention switches from domain key (or local key) to shared key upon sending a document, for example, in an e-mail. A policy enforcer detects a document is sent to a domain different from the current domain. The policy enforcer replaces key data of the document that is encrypted with a domain key Kd with key data encrypted with shared key Ksh.

In an implementation, a method for a shared key ring includes: a policy enforcer that maintains a shared key ring that contains exactly one domain key and one or more shared key; raw data files are encrypted with domain key (Kc+kd) by default; and to share a document, key encryption data portion is reencrypted with Ksh.

In an implementation, a method for sharing in-place includes: an encrypted document is sitting on a file server accessible from two different domains; to share a document, reencrypt the key data portion of the document using a shared key Ksh; and to stop sharing, reencrypt the key data portion of the document using a domain key Kd.

In an implementation, a method for switching from domain key to shared key on send (e.g., e-mail) includes: a policy enforcer detects a document is sent to a domain different from current domain; and the policy enforcer replaces key data of the document that is encrypted with a domain key Kd with key data encrypted with shared key Ksh.

In an implementation, a method of controlling document access using centrally managed rules, the method including: distributing a first plurality of rules to a client system from a central rule database, where the first plurality of rules distributed to the client system contain at least one expression used by the client system to perform access control for documents accessed by the client system, and where the client system rule distributing step dynamically selects the first plurality of rules for the client system; distributing a second plurality of rules to a server from the central rule database, where the second plurality of rules distributed to the server contain at least one expression used by the server to perform access control for documents stored on the server, where the server rule distributing step dynamically selects the second plurality of rules for the server, and where rules in the central rule database are maintained by a central rule server.

Some aspects of the invention include: (1) Two views of an encrypted file depending on trust. (2) using policy enforcer to manage keys. This is in contrast to an encrypted file system using the operating system to encrypt, and digital rights management system uses an application, such as a media player. (3) How encryption works as an extension. (4) How trust is established.

In various implementations, (1) a trusted application sees unencrypted data of a document but a untrusted application sees encrypted data of the same document. One file is being served two ways. (2) Using policy enforcer to manage encryption keys and how keys are used. May also include local and share key concepts. (3) Encryption is an extension to policy enforcer. Policy enforcer can work without encryption extension. Encryption has policy enforcer obtaining the key. Logistics in getting key and then encrypt. Logistics in getting key and then decrypt.

(4) The process on establishing trust on an application program and application of trust in a policy enforcer extension. Policy enforcer establishes trust on an application program (or a process). Trust is being applied in encryption. For example, no trust, then no decrypted data. (5) Auto switching encryption key on an encrypted document. Switching from local encryption key to shared encryption key: when attaching to an e-mail; when sending in an e-mail; or when copying a file form local computer to a file server. Switching from shared encryption key to local encryption key: when saving an to local disk; or when copying a file from file server to local computer.

In further various implementations, (1) policy driven encryption based on document content or document attribute. (2) Autowrapping a regular file (automatically encrypting the file): autowrapping on e-mail send; autowrapping on attach to e-mail; or autowrapping on ZIP or using another file archiver format (e.g., RAR, 7z, XZ, BZIP2, GZIP, TAR, ZIP, WIM, ARJ, CAB, CHM, CPIO, CramFS, DEB, DMG, FAT, HFS, ISO, LZH, LZMA, MBR, MSI, NSIS, NTFS, RAR, RPM, SquashFS, UDF, VHD, WIM, XAR, or Z).

In an implementation, a method for preventing misuse of encrypted document content includes: providing an encryption service running on a computing device; accessing an encrypted document by an application program on the computing device; intercepting the accessing an encrypted document operation at the encryption service; identifying the application program attempting the accessing an encrypted document operation; determining if the application program can be trusted to protect unencrypted content of the encrypted document; if the application program is determined to be trusted, decrypting the encrypted document to produce unencrypted content and providing the unencrypted content to the application program; and if the application program is determined not to be trusted, providing encrypted content of the encrypted document to the application program.

In various implementations, the encryption service is a file system filter device driver. The encryption service is a device driver. Accessing an encrypted document includes any one of opening the encrypted document or reading the content of the encrypted document. Identifying the application program attempting the accessing an encrypted document operation includes examining a process that invokes the accessing an encrypted document operation.

Determining if the application program can be trusted to protect unencrypted content of the encrypted document further includes: querying a policy enforcer to determine if the application program can be trusted to protect unencrypted content of the encrypted document. If the application program is determined to be trusted, decrypting the encrypted document to produce unencrypted content further includes: obtaining an encryption key from a policy enforcer to decrypt the encrypted document.

In an implementation, a method of distributing encryption keys in an information management system includes: providing a plurality of encryption keys for encrypting and decrypting documents, where the plurality of encryption keys are stored in a key management server; providing a plurality of policies for controlling access to documents, where the plurality of policies are stored on a policy server; providing a policy enforcer on a computing device; accessing an encrypted document by an application program, where the application program runs on the computing device; distributing a subset of the plurality of polices to the policy enforcer, where the policy enforcer enforces the subset of the plurality of polices to control access to documents at the computing device; distributing a subset of the plurality of encryption keys to the policy enforcer, wherein the policy enforcer manages the subset of the plurality of encryption keys to control encryption and deception of documents at the computing device; intercepting the accessing an encrypted document by an application program by the policy enforcer; evaluating at least one policy in the subset of the plurality of policies by the policy enforcer to determine if the accessing an encrypted document by the application program should be allowed; if the accessing an encrypted document by the application program is not allowed, denying access to the encrypted document by the application program; and if the accessing an encrypted document by the application program is allowed, providing an encryption key for decrypting the encrypted document to produce unencrypted content of the encrypted document and providing the unencrypted content to the application program.

In various implementations, the key management server and the policy server are the same. Accessing an encrypted document includes any one of opening the encrypted document, or reading the content of the encrypted document. Distributing a subset of the plurality of polices to the policy enforcer is performed periodically. A policy enforcer requests an encryption key from key management server by key ring name. The decrypting the encrypted document to produce unencrypted content is handled by an encryption service of the operating system.

Other objects, features, and advantages of the present invention will become apparent upon consideration of the following detailed description and the accompanying drawings, in which like reference designations represent like features throughout the figures.

DETAILED DESCRIPTION OF THE INVENTION

A policy enforcement system that controls access to and usage of data in a document is described in U.S. provisional patent application 60/755,019, filed Dec. 29, 2005. Associating ancillary data to documents and tagging are described in U.S. provisional patent application 61/357,016, filed Jun. 21, 2010. More details on policy enforcement are described in U.S. patent application Ser. Nos. 11/383,159, 11/383,161, and 11/383,164, filed May 12, 2006, and Ser. No. 11/615, 477, filed Dec. 22, 2006. These applications are incorporated by reference along with all other references cited in this application.

Figure 1:
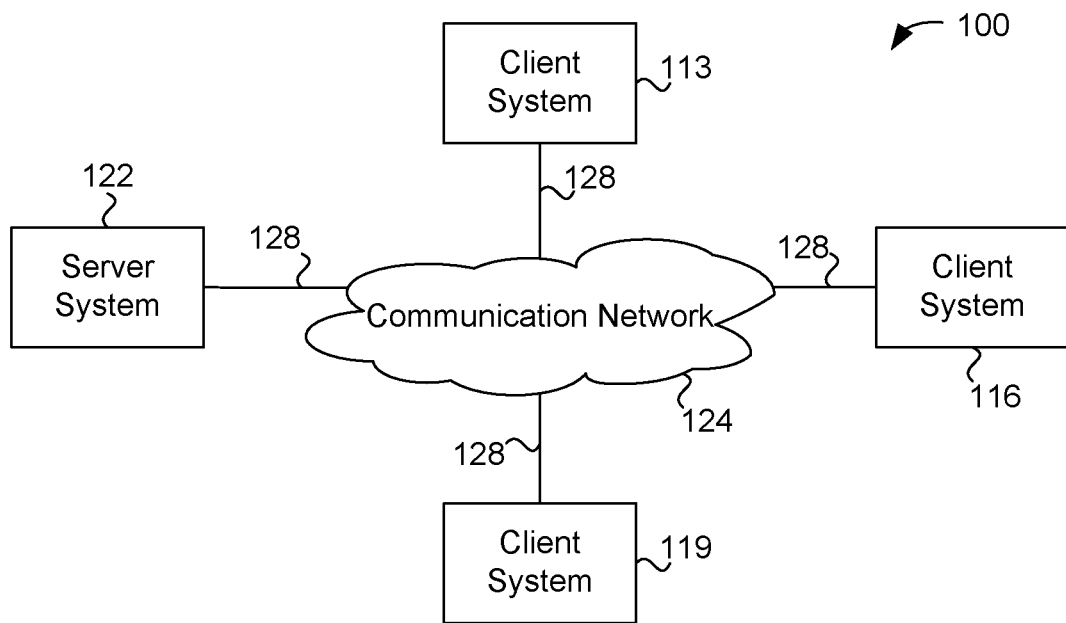
FIG. 1 shows a simplified block diagram of a distributed computer network 100 incorporating an embodiment of the present invention.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, and others.

Figure 2:
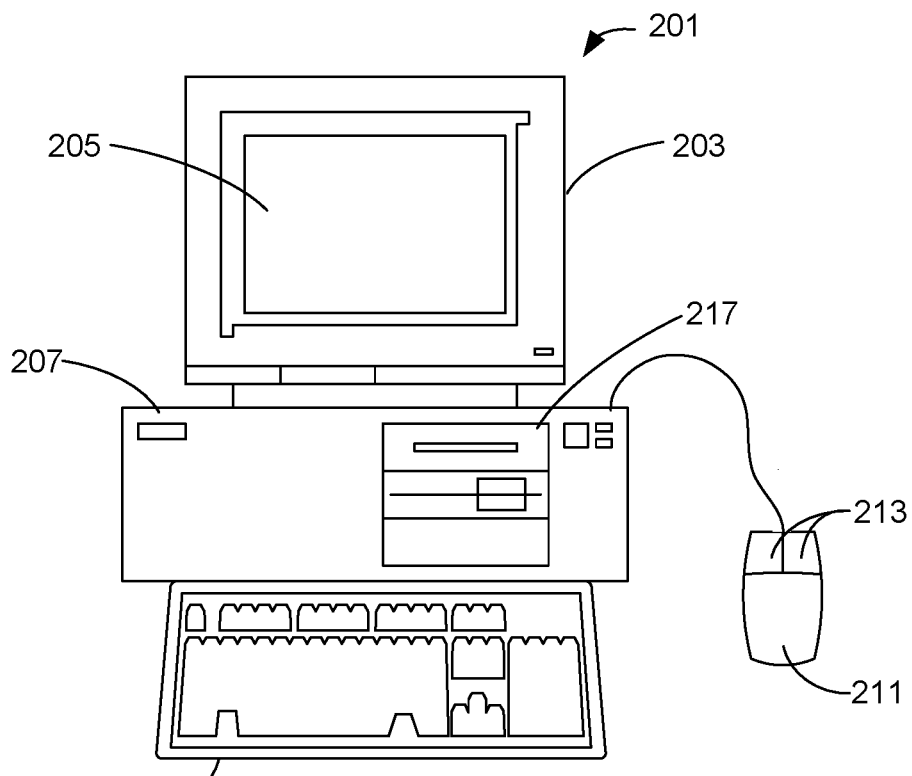
FIG. 2 shows a more detailed diagram of a computer system which may be a client or server.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
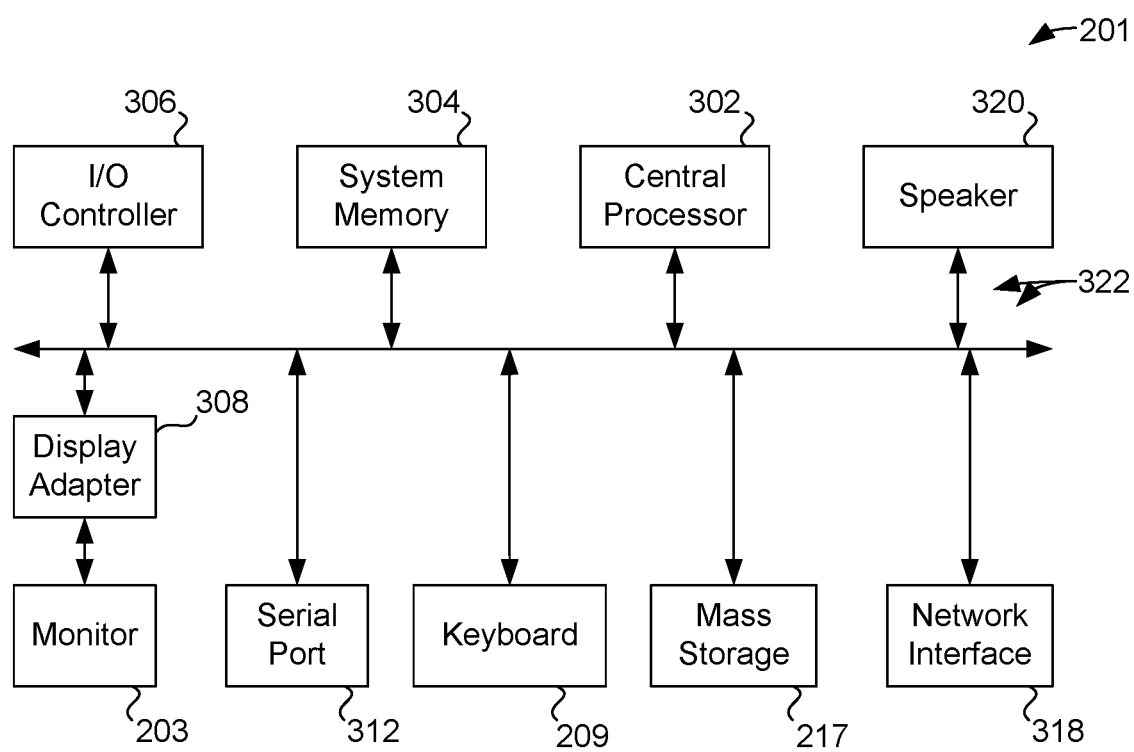
FIG. 3 shows a system block diagram of computer system 201 used to execute the software of the present invention.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, or Microsoft Xbox 360 central processing unit (CPU).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows Vista, Windows 7, Windows 8, Windows CE), Linux, UNIX, Sun OS, Ubuntu, or Macintosh OS X. Some mobile operating systems that can be used with an implementation of the invention include: Google Android, Chrome OS; Apple iOS4 or iOS5; Blackberry OS; Windows Phone 7. Other operating systems may be used. Microsoft Windows is a trademark of Microsoft Corporation.

Declarative Policies

An information management system may provide access control and information usage protection to documents using declarative policies (also referred to as "information management policies"). One or more policies may be written to limit access of a document or documents from particular users and enforced by the system. A policy enforcer running on a computing device may be responsible for enforcing policies that control access to a document and use of content in a document. Documents being protected are unaltered and remain in place on a file server or in an application data repository (e.g., Microsoft Exchange® message store). For example, a document being protected does not need to be encrypted. A document being protected does not need to be moved into a repository. A document being protected does not need to be placed in an envelope. An envelope refers to a regular file of a particular file format tailored for a particular information management system in which a document (or file) being managed may be embedded to facilitate management of the document by the information management system.

A document may be a file system or nonfile system object. For example, a file system object may be an Excel spreadsheet. A nonfile system object may be an e-mail message or data delivered to an SAP® Frontend client application (e.g., information about an employee) by an SAP human resource module running on a server. For example, a non-file system object may be a web page produced by Microsoft SharePoint Server®. In another example, a non-file system object may be a webpage, a form or a unit of information delivery to a client from a Product Lifecycle Management (PLM) application. Some examples of disk file systems include FAT, NTFS, HFS, ext2, ext3, ISO 9660, ODS-5, and UDF.

A document may encompass objects such as a file, an e-mail message, a Web page, an on-line report, an on-line form, a discussion thread, a result set generated by a database query, an on-line form, a bitmap, a file system object, a data object managed by a document management system, a data object managed by a content management server, a data object in a product lifecycle management system, a source code file or a code fragment managed by a source code management system, a data object managed by a configuration management system, a data object managed by a project management system, a data object in an enterprise resource planning system, a data object in a customer relationship management system, a data object managed or served, or both, by a portal server, a data object served by a Web server, a data object managed or served by any application server, or any unit of information content stored using volatile or nonvolatile memory.

An information management system controls access to information of the system by supporting information management policies. A policy may be defined in different languages such as Blue Jungle's Compliant Enterprise Active Control Policy Language (ACPL) format that uses a declarative approach to policy specification. More detailed information about the ACPL language may be found in U.S. provisional application 60/870,195, filed Dec. 15, 2006, which is incorporated by reference. A policy may also be defined in Extensible Access Control Markup Language (XACML), a declarative access control policy language implemented in XML. XACML 2.0 is an open standard ratified by OASIS® standards organization.

Some examples of a workstation include a desktop computer, laptop computer, personal digital assistant (PDA), smart phone, thin client (e.g., HP Consolidated Client Infrastructure client or Wyse terminal), an instance of client operating environment running on a terminal server (e.g., Microsoft Windows 2003 Terminal Services and Citrix MetaFrame), a guest operating system running on a virtual machine (e.g., VMware Workstation and Microsoft Virtual Server 2005), a server making document access or information usage request (e.g., acting as a client in the context of the request), Internet kiosk, and information kiosk. A workstation may be any computing device and computing environment from which document access or information usage request is originated.

A policy server may create, manage, or create and manage policies. Policies may define to whom and under what condition (or conditions) access to a document is granted or denied.

Policies may be used to make declarative statements of policy without being burdened by implementation details. In example 1 below, a declarative policy limits access to Microsoft Excel® spreadsheets in the finance department folder (e.g., "/finance/") to employees in the finance department only. When a user in another department attempts to open a Microsoft Excel spreadsheet in the finance department folder, the open operation is denied.

Example 1

FOR document.name="/finance/*.xls"
ON OPEN
BY user=Finance
DO ALLOW OTHERS DENY

Figure 4:
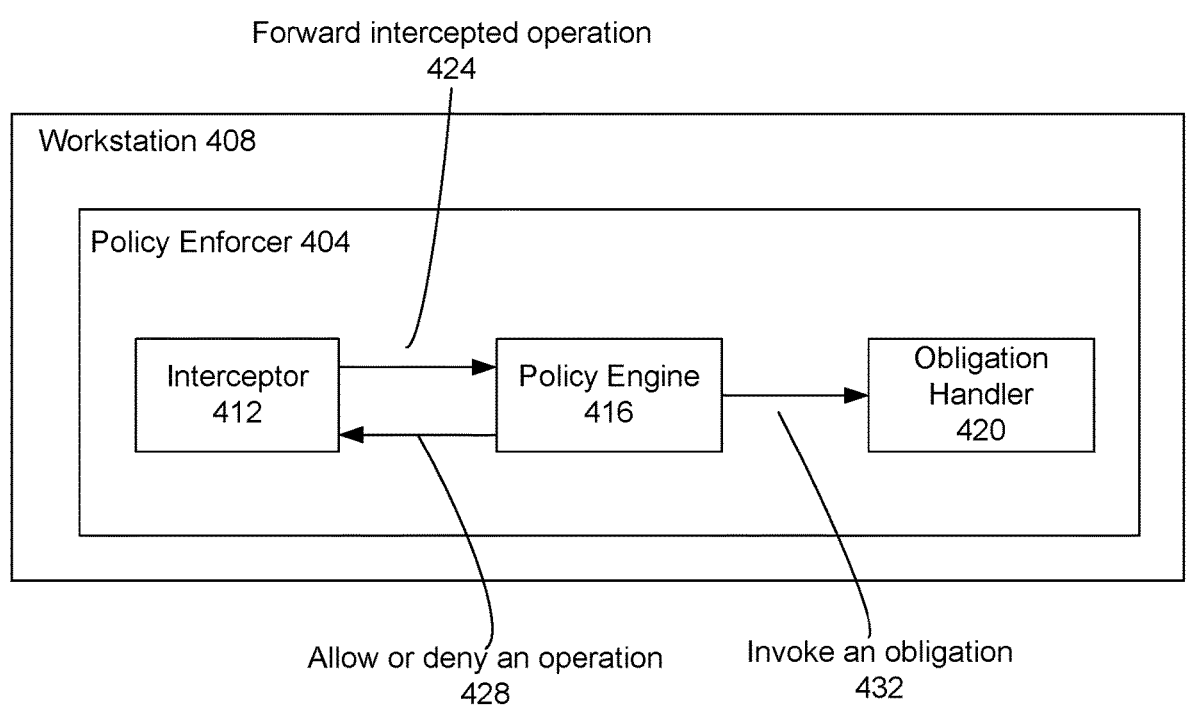
FIG. 4 shows a simple block diagram of a policy enforcer for implementing one or more policies.

FIG. 4 shows a simple block diagram of a policy enforcer for implementing one or more policies according to a specific implementation of the invention. A policy enforcer 404 is installed on a workstation 408 to protect documents on the workstation and documents accessible from the workstation. As shown in the figure, the policy enforcer includes an interceptor 412, a policy engine 416, and an obligation handler 420.

In an implementation, a policy enforcer is able to perform information access control for operations resulting from user action through an application program and execution of application program logic. The policies allow policy enforcers (which may be called agents in specific embodiments) to make decisions on whether to allow or deny access to a particular information, execute a particular application function, or operate on a particular application data object or fragment.

The inceptor of the policy enforcer intercepts the operating system and application operations related to document access and use of content in a document to exert control over the operating system or application operation. The intercepted operation and related information are forwarded to the policy engine 424. The policy engine evaluates at least one declarative policy relevant to the operation to determine if the operation should be allowed. If the operation is allowed, the operation continues to completion 428. If the operation is denied 428, the interceptor blocks the operation.

The policy engine evaluates at least one policy of the set of policies associated with the action. Policies or subsets of policies, or both, may be transmitted to the workstation to control document accesses and information usage. The policy enforcer installed on the workstation may control end-user access to and usage of documents (or information) on the workstation and application program functions.

The policies may specify obligations that are processed by an obligation handler. The obligation handler is a code module that carries out obligations supported by the policy system architecture. If a policy evaluated by the policy engine specifies an obligation, the policy engine invokes the obligation 432 by calling the obligation handler. An obligation may be implemented in a Policy Enforcement Point (PEP). In this case, the policy engine instructs a PEP to carry out an obligation when it returns the result of policy evaluation. The policy engine may obtain a PEP's obligation handling capabilities via a configuration file, an initial handshake between a PEP and the policy engine, or when a PEP forwards an intercepted operation to the policy engine for evaluation.

Both document-at-rest and document-in-motion may be protected using declarative polices (such as NextLabs ACPL®). A policy may be implemented by a policy enforcer. A policy enforcer may implement encryption to enhance data protection. Document-at-rest refers to a document stored temporary or permanently on a storage device such as memory, hard disk, CD-ROM, DVD-ROM, Flash drive, Flash card, tape, and more. Document-in-motion refers to a document being sent or transferred via a network that has not reached its destination. Examples of document-in-motion include: (a) an e-mail message that has been sent but has not yet reach its recipient's mailbox; (b) a file being transferred using FTP (file transfer protocol); (c) a file or a webpage being downloaded from a Web server (e.g., using HTTP protocol); (d) a message or a file being sent using an instant messaging program; and more.

The components and configuration of the block diagram in FIG. 4 are not intended to limit the invention. For example, in an implementation, the policy enforcer has a plurality of interceptors and a plurality of obligation handlers. Further, a policy engine may run in a process separate from a policy enforcer. The policy decision process and policy enforcer may run on the same computer or on separate computers.

Figure 5:
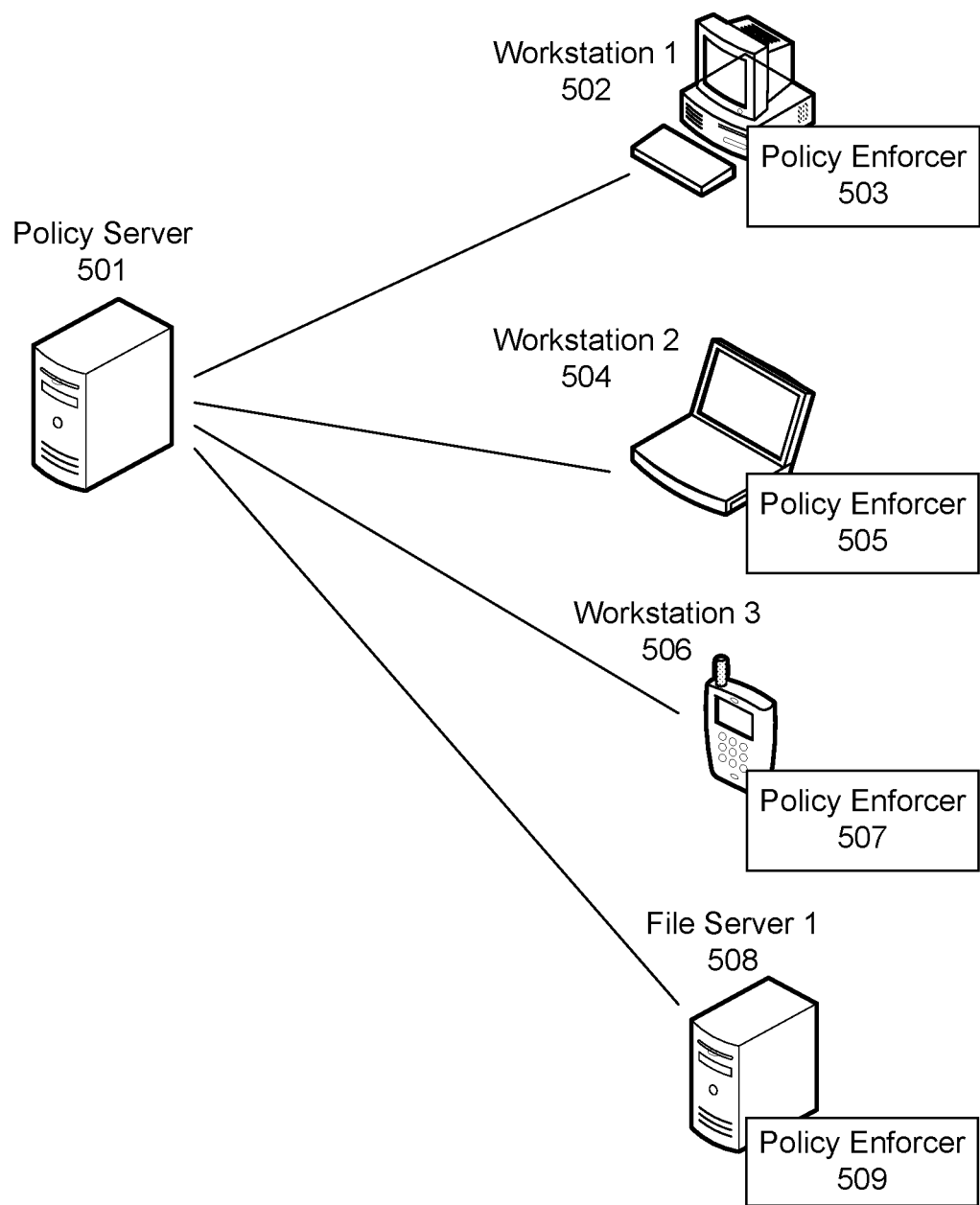
FIG. 5 shows an information management system with a plurality of policy enforcers running on different types of computing devices.

FIG. 5 shows an information management system with a plurality of policy enforcers running on different types of computing devices according to a specific implementation of the invention. A plurality of policy enforcers 503, 505, 507, 509 are installed on a plurality of computing devices (or workstations) 502, 504, 506, 508. The policy enforcers may control access to documents and use of contents in the documents. Each policy enforcer protects documents on its host computing device. A policy enforcer also controls access to a document stored on another computing device and usage of the content of the document on the host computing device. In an implementation, a policy enforcer protects documents at rest. In another implementation, a policy enforcer protects documents in motion. In yet another implementation, a policy enforcer protects documents at rest and documents in motion.

A policy server 501 manages a plurality of policies for controlling access to documents and use of content in a document. In an implementation, the policy server sends a subset of the plurality of policies to the computing devices periodically. In an implementation, policies are sent to the computing device by a user by invoking a send policy operation manually. In another implementation, the system sends the policies to the computing device when a particular condition is met (e.g., a new policy is defined, at a particular time of day, or when a user logs onto the computing device).

In an implementation, only policies relevant to a computing device are sent to the computing device. In another implementation, policies are sent to computing devices and the computing devices determined which policies are applicable to it. The policy server may send an entire subset of policies relevant to a computing device or send the changes to policies since the last update.

A computing device may include a computer, smart phone, tablet, book reader, file server, e-mail server, Web server, instant messaging server (e.g., Jabber®), collaboration server (e.g., Microsoft SharePoint®, IBM Lotus Notes®), document management server, ERP (enterprise resource planning) servers, CRM (customer relationship management) server, Product Lifecycle Management (PLM) server, and more. Access to a document includes opening a file, writing to a file, renaming a file, copying a file, deleting a file, or changing file attributes (e.g., owner or timestamp), opening an e-mail, sending an e-mail, deleting an e-mail, viewing a webpage, posting content to a website, downloading a file from a website, uploading a file to a website, and more. Use of content in a document includes adding, editing, deleting, copying, formatting text, picture, video, URL (universal resource locator), and other elements in a document. Other elements in a document may include a formula in a spreadsheet, a script in a Microsoft PowerPoint® presentation, an annotation on a Adobe Acrobat PDF® file, a graphics element in a AutoCAD® drawing, and more.

In an implementation, the files, documents, information, and content of the information management system is not encrypted. The information is in the same format as natively stored by an application or the operating system. In an implementation, the information management system does not encrypt the information or content before it is stored. Then when the information management system is not operating or in effect, the unencrypted information or content can be opened and viewed without restriction by the application program the information or content was intended for. However, when the information management system is operating, even if the information or content is not encrypted, the information management system prevents the opening or viewing (or other operation prohibited by a policy) by the application program (e.g., policy says to DENY open operation). The information management system can trap the operation at the operating system level, and prevent an opening or viewing operation. With the information management system operation, encryption is not needed to prevent viewing.

In an implementation, the information management system can encrypt (e.g., as directed or based on a policy) the information or content before it is stored, e-mailed to another user, and so forth. In this case, even when the information management system is not operating or in effect, the information will not be viewable unless the user unencrypts the information first.

Using Encryption to Extend Protection

Without encryption, an active policy enforcer protects a document when (i) the document is at rest on a computing device; or (ii) when a document is in motion while passing through an enforcement point where a policy enforcer may exert control. There are situations where a policy enforcer is unable to protect a document. Examples of such situations include: (a) when a document is in motion before reaching an enforcement point (e.g., an e-mail is being sent but it has not reach a perimeter filter protected by a policy enforcer); (b) a policy enforcer on a computing device is disabled; and (c) a storage device is physically removed from a computing device protected by a policy enforcer.

In the case of a document-in-motion, when a document leaves a host computing device protected by a policy enforcer, the policy enforcer on the host computing device will not be able to protect the document while it is in transit. For example, if a document is attached to an e-mail by User A and the e-mail is sent to a recipient User B in the company, the document is protected by a policy enforcer while it is on User A's computer. The document is also protected by a policy enforcer on User B's computer when it arrives. However, when the e-mail is in transit between User A's computer and User B's computer, policy enforcers at both computers are unable to protect the document. Similarly, when a file is transferred between two computers (or downloaded from a server), the contents of the file are not protected while the file is in transit, if the file transfer is carried out without using an encrypted transport.

In the case of a disabled policy enforcer, a policy enforcer may be disabled as a result of a hacking attempt. Alternatively, a computer may be rebooted without a policy enforcer running. For example, if a hacker gains administrative (or root) access to a computer, the hacker may be able to disable a policy enforcer. As a result, documents on the computer are no longer protected by the policy enforcer. In another example, a hacker gains access to a computer and reboots the computer with a different operating system that does not have a policy enforcer installed. When the computer boots up, the documents on the computer are no longer protected by a policy enforcer.

In the case where a storage device is physically removed from a computer, documents on the storage device are no longer protected by a policy enforcer on the computer.

When protecting information leakage for any of the above three situations is important, a policy-based information management system may encrypt documents whenever full-time protection is desired. Full-time protection refers to protecting content of a document at all times, even when content of the document is not under protection of a policy enforcer. However, a person of skill in the art would recognize other situations where the policy enforcer would be unable to protect a document.

Encryption Service as an Add-on

In an embodiment of the invention, an add-on provides encryption service to an information management system that uses declarative policies to protect access to documents and use of content in a document. Encryption of a specific document may be specified as an obligation in a declarative policy. Not all documents managed by an information management system need to be encrypted. In an implementation, only documents that require extra protection are encrypted. In another implementation, documents selected by a user are encrypted. In another implementation, all documents managed by an information management system are encrypted.

In example 2 below, a declarative policy instructs a policy enforcer to encrypt a document if the document is classified "top secret" and the document is saved by an employee.

Example 2

FOR document.name="*"
WITH (document.classification="top secret")
ON SAVE
BY user=Employees
DO ALLOW AND ENCRYPT In example 3 below, when a document classified as "confidential" is sent by an employee as an of an e-mail, a policy directs a policy enforcer to encrypt the document before allowing the e-mail to be sent.

Example 3

Figure 6:
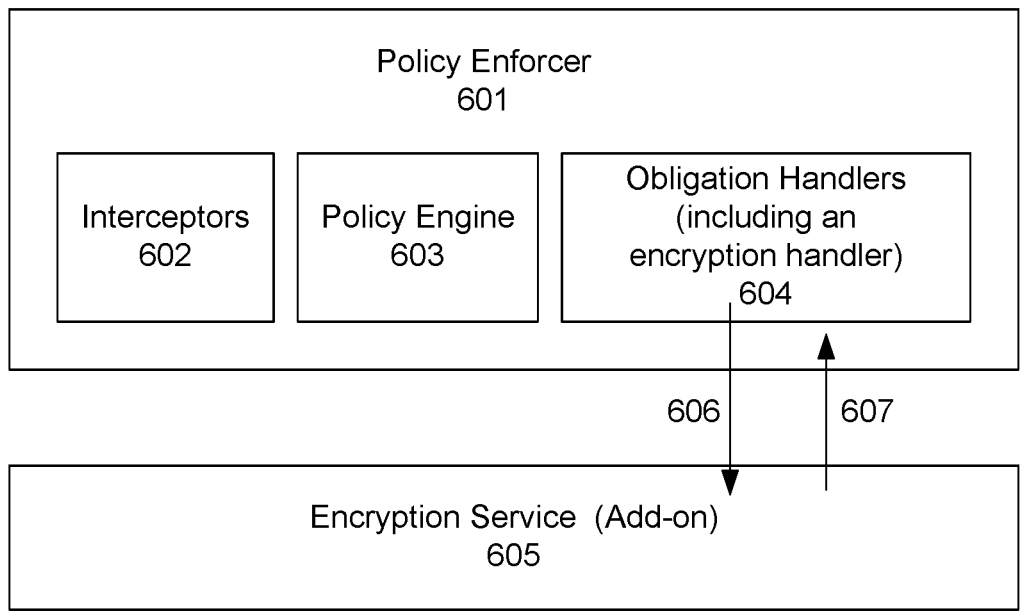
FIG. 6 shows a policy enforcer with an add-on providing encryption service.

FOR email.recipient="*"
WITH (email..classification="confidential")
ON SENT
BY user=Employees
DO ENCRYPT FIG. 6 shows a policy enforcer with encryption service add-on according to a specific implementation of the invention. A policy enforcer 601 includes one or more interceptors 602, a policy engine 603, and one or more obligation handlers 604. The policy enforcer interacts with encryption service add-on 605 via an encryption handler. In the figure, the obligation handlers include the encryption handler. In another implementation, the encryption handler implements encryption service performs by encryption service add-on. When a policy obligation specifies the encryption of a file, the obligation handler invokes an encryption function 606 in the encryption service add-on to encrypt a document. To encrypt a document the encryption service add-on requests an encryption key from the policy enforcer 607. In another implementation, the encryption service add-on may obtain a key from a configuration file, a database, or another key management application program. In an implementation, an obligation handler is not present at a policy enforcer. The encryption function is invoked for each file via the encryption service, independent of whether a policy obligation specifies the encryption of a file.

In an implementation, the interceptor is a policy enforcement point which is responsible for intercepting (or sensing, or detecting) operations on documents and implementing policy decisions. A policy decision may include allowing an operation to be carried out, denying an operation, logging an operation in an activity log, altering an operation, and more.

The policy engine is a policy decision point where a subset of information management policies relevant to the intercepted operation is selected and evaluated. Relevant policy selection may be based on a number of factors such as the current user, document being accessed, or current user and document being accessed. A policy decision may be "allow" or "deny." In an implementation, a valid policy decision may also include logging or other auxiliary tasks. In another implementation, logging and other auxiliary tasks are implemented as obligations.

The obligation handlers are responsible for carrying out tasks before or after policy evaluation. It is often implemented as plug-ins or add-ons to a policy enforcer. For example, a logging obligation handler may log an intercepted operation into an activity database before the policy engine evaluates the policies. In another example, a logging obligation handler logs only operations that are denied by a policy engine whereby logging occurs only after the policy engine evaluates policies on an operation. In another example, an encryption obligation handler encrypts a document when directed by a policy. In yet another example, a notification obligation handler sends an e-mail message to an administrator notifying the administrator of a failed attempt to access a document classified as "top secret."

Other policy syntax that directs a policy enforcer to encrypt a document may be used. For example, a policy syntax "ENCRYPT USING <KEY>" may direct a policy enforcer to encrypt a document using a particular encryption key named <KEY>. For example, <KEY> is the name of a key such as "Engineering_Document_Key". In another example, a policy syntax "ENCRYPT USING <KEY_RING>" may direct a policy enforcer to encrypt a document using an encryption key in a particular keyring (or key ring)

named <KEY_RING>. A key ring is an object that holds a collection of encryption keys. A key ring may be addressed by its name such as "My_Key_Ring" and each key inside the key ring may be addressed using an identifier. Besides using a declarative policy to direct encryption service to encrypt a document, other means to direct encryption service to encrypt a document may be applied.

In an implementation, the decision to encrypt a file is based on an attribute associated with a directory. When encryption service intercepts an operation to create a file on a file system, the encryption service attempts to locate an encryption required attribute associated with the directory where the file will be created. If an encryption required attribute exists and it specifies a file created in the directory should be encrypted, the encryption service will encrypt all data written to the file. If the encryption required attribute is absent or it specifies a file created in the directory should not be encrypted, no encryption will be performed on the file by the encryption service.

In an example, the following policies specify that only employees may save documents in directory "/confidential/" and documents saved to the directory should be encrypted. The first policy "Policy 1" specifies encryption using policy syntax "ENCRYPT" which directs the policy engine to invoke the encryption obligation handler when it evaluates the policy. The encryption obligation handler then instructs encryption service to encrypt data written to the file involved in the policy enforcement action. The second policy "Policy 2" does not specify encryption through policy. Instead, an encryption required attribute on directory "/confidential/" is set to indicate that files in the directory should be encrypted. When a file is saved to the directory, the file save operation is intercepted and Policy 2 is evaluated. If the file save operation is allowed to continue, encryption service intercepts the file save operation. The encryption service check the encryption required attribute on directory "/confidential/" and the encryption required attribute indicates the file should be encrypted. The encryption service performs encryption on data to be written to the file. This is shown in example 4 below.

Example 4

Policy 1—Encrypt a file using obligation
FOR document.name="/confidential/*"
ON SAVE
BY user=Employees
DO ALLOW AND ENCRYPT
Policy 2—Encrypt a file by setting a directory attribute
(encryption required attribute on "/confidential/" is set)
FOR document.name="/confidential/*"
ON SAVE
BY user=Employees
DO ALLOW An encryption required attribute on a directory indicates to the encryption service whether a file created in the directory or a file copied to the directory should be encrypted. An encryption required attribute may be implemented in a variety of ways, such as an extended file system attribute on a file system, a lookup table entry, or other.

An encryption required attribute may be set in a system in different ways. When an encryption required attribute is implemented as an extended file system attribute on a Linux file system such as Ext2, Ext3, XFS or JFS, an integer or string value may be stored in the extended file system attribute to indicate if the attribute is set. An encryption required attribute may also be used to indicate if a file should be encrypted. When an encryption required attribute is absent, a file created in the directory (or copied to the directory) may not be encrypted. On Microsoft NTFS® file system, a custom NTFS stream associated with a directory may be used to store an encryption required attribute. Similarly, the presence of a custom NTFS stream may be used to indicate an encryption required attribute is set.

When an encryption required attribute is implemented using a lookup table, the lookup table may contain a list of directories where encryption should be applied. The content of the lookup table may be loaded from a configuration file or populated by a policy enforcer or other source. An encryption required attribute on a directory may also be set manually or set using a policy.

Further, subdirectories inside a directory with an encryption required attribute may inherit the encryption required attribute. Copying a directory with and encryption required attribute should also set the encryption required attribute of the destination directory.

In an implementation, encryption service is implemented as a kernel device driver of an operating system. A kernel device driver may include file system filter driver, file system driver, or the like. In another implementation, encryption service operates in user mode of an operating system. In yet another implementation, encryption functions of encryption service operates in user mode and decryption functions of encryption service operates in kernel mode.

In an implementation, encryption service operates in both user mode and kernel mode.

In a specific implementation of the invention, encryption service is an integral part of the policy enforcer.

Tying Encryption to Policy Enforcer

In an embodiment of the invention, a policy enforcer of an information management system enforces information management policies, manages encryption keys, and controls encryption and decryption of documents. The information management policies of the information management system are responsible for controlling document access and document content usage. The information management policies may also be used to direct encryption of documents. When fulltime protection of the content of a document is needed, a policy enforcer may be directed to encrypt the data written to the document. The policy enforcer uses local encryption keys and shared encryption keys to encrypt and decrypt documents resided on host computing devices and remote computing devices (e.g., document-at-rest) and documents about to be sent or transferred (e.g., document-in-motion) so that encryption may be performed without user intervention.

After a document is encrypted, the role of controlling access to the document and controlling usage of content of the document remains the responsibility of the information management policies and the policy enforcers that implement (or enforce) the information management policies. The role of encryption in the information management system is to provide fulltime protection to content of a document whether the document resides on a computing device being managed by a policy enforcer of the information management system or does not reside on a computing device being managed by a policy enforcer of the information management system. For example, encryption protects a document when the document is in motion (e.g., a document is in transit before it reaches a destination computing device that is protected by a policy enforcer) where the document is not protected by a policy enforcer of the information management system.

Not all documents managed by an information management system need to be encrypted. The protection offered by a policy enforcer and information management policies without using encryption is comprehensive and adequate for most situations. Encryption may be applied when fulltime protection is needed.

By implementing encryption through a policy enforcer of an information management system, document encryption and decryption occur transparently without intervention by a user or require a special application program. This policy enforcer directed encryption and decryption system (or "enforcer directed encryption") behavior is similar to file system encryption, yet without the shortcomings of file system encryption.

First, file system encryption often leaves document data vulnerable when document data is in motion (e.g., transferred through a network) unless encrypted transport is used to transfer a document. For example with Microsoft NTFS®, if an encrypted file is opened over the network, the data that is transmitted over the network is not encrypted. Enforcer directed encryption keeps an encrypted document protected while the document is accessed across the network because an encrypted document remains encrypted when transmitted over the network and decryption occurs only on the client computing device with the supervision of a policy enforcer. A policy enforcer continues to control usage of the content of the document according to the information management policies that govern access to the encrypted document and usage of the content of the encrypted document. The process of decrypting an encrypted document on the client computing device is transparent to a user because a policy enforcer automatically applies the correct encryption key to decrypt the document.

Second, some encrypted file systems decrypt an encrypted file when the file is copied to a file system that does not support encryption. For example, copying an encrypted file from Microsoft NTFS® to Microsoft FAT® file system will cause a file to be decrypted. Other encrypted file systems copy an encrypted file to another file system treating content of the encrypted file as binary data on the target file system rendering the file useless without the encryption key needed to decrypt the document. A document encrypted using enforcer directed encryption may be moved among file systems or computing devices. When an encrypted file is moved from one computing device to another computing device, a policy enforcer automatically re-encrypts the encrypted file with a shared encryption key, if needed, without any intervention from a user. This makes the process of copying (or moving) an encrypted file transparent. Further details on shared encryption key are described below in this document.

Third, file system encryption (or an encrypted file system) is often operating system dependent (e.g., Microsoft NTFS® encrypted file system is only available to Microsoft Windows® operating system). With enforcer directed encryption, a document may be encrypted by a policy enforcer on one operation system (e.g., Microsoft Windows®) and decrypted by a policy enforcer on a different operating system (e.g., Linux®) transparently without any user intervention.

There are more advantages to implementing encryption using a policy enforcer. For example, an encrypted file system cannot protect a file when the file is attached to an e-mail. A policy enforcer allows an encrypted document to remain encrypted while attached to an e-mail. A policy enforcer automatically handles encryption key management issues allowing the protection to the document to be maintained while the document is in motion (e.g., sent with an e-mail). A policy enforcer on a recipient's computing device will automatically locate the correct decryption key to decrypt the document and continues to protect access to the document and usage of the content document according to the information management policies governing access to and usage of the document.

Since access control to a document is enforced by a policy enforcer according to polices relevant to the access operation and the document being accessed, the decision to decrypt a document may occur only after access to the document is authorized. In an implementation, a policy enforcer provides the necessary encryption key to encryption service and directs the encryption service to decrypt a document. In another implementation, a policy enforcer directs encryption service to decrypt a document and the encryption service requests a key from the policy enforcer using information it retrieves from the document. In yet another implementation, encryption service intercepts a file open operation on an encrypted file a request a key from a policy.

Trusted Application

In an embodiment of the invention, encryption keys are managed by a policy enforcer and an encryption service requests an encryption key from a policy enforcer prior to encrypting or decrypting a document. When a policy enforcer is disabled, encryption service will not be able to decrypt a document because encryption service does not have access to the encryption key required to decrypt the document. A policy enforcer provides an encryption key to an encryption service only if the policy enforcer can trust an application program (or process) that attempts to access an encrypted document. To establish trust with a policy enforcer, an application program must be able to enforce information management policies and has successfully communicated with the policy enforcer. In addition, the application program must have triggered a policy evaluation recently and the policy evaluation must have produced an "allow" policy effect (e.g., allowing access to an encrypted document).

A trusted application is an application program on a computing device that cooperates with a policy enforcer to implement information management policies and the application program is entrusted by the policy enforcer to handle decrypted document data.

In an implementation, trust is established between an application program instance and a policy enforcer. In this case, the policy enforcer uses a process id of the application program instance to identify the trusted application program.

In an implementation, the trust between an application program and a policy enforcer may expire after a time period. Trust can be re-established when the application program requests policy evaluation and the policy evaluation produces an allow policy effect.

In another implementation, encryption service is implemented as a file system filter driver. When an application opens a document (or file), encryption service intercepts the corresponding file open operation and checks if the document is encrypted. If the document is not encrypted, the encryption service passes the file open operation to the next file system device driver. If the document is encrypted, the encryption service requests a key from the policy enforcer by passing information associated with the file open operation to the policy enforcer. Upon receiving a get key request, the policy enforcer checks if the application program that initiates the file open operation can be trusted. If the application program is trusted, the policy enforcer returns a key to the encryption service. The encryption service stores the key for use in subsequent file read, file write and other file operations. The encryption service may discard the key when a file is closed. To complete the file open operation, the encryption services passes the file open operation to the next file system device driver. If an application program is not trusted, the policy enforcer returns an error status. Upon receiving an error status, the encryption service may deny the file open operation (e.g., return an error) or allow access only to the encrypted data.

In an implementation, encryption service operates as an add-on to a policy enforcer. As such, it relies on the policy enforcer to provide a trusted application service to identify if an application program can be trusted with unencrypted content. The encryption service also relies on the policy enforcer to provide key management service that provides an encryption key to facilitate encryption and decryption. The cooperation between policy enforcer and encryption service provides continuous protection to decrypted content of an encrypted document by a policy enforcer according to information management policies and prevents the decrypted content from being misused. On the other hand, when a encrypted document is no longer protected by a policy enforcer (e.g, a document is removed from a computing device or in motion), the encrypted document remains protected because the encryption key requires to decrypt the encrypted document is protected by a policy enforcer.

In an implementation, an untrusted application program is an application program that does not require unencrypted document data. This greatly reduces the overhead associated with the overall computing system since computing cycles are saved by not needing to decrypt files. For example, if the application program is a backup program, it does not require unencypted document data. The system would recognize the backup program as an untrusted application (such as through the backup program's application identifier) and transmit encrypted document data to it. This allows the backup program to backup the file in its encrypted format. This prevents persons that may get access to the backup made by the backup program from reading the document data.

Specific implementations of a flow are presented in this patent, but it should be understood that the invention is not limited to the specific flow and steps presented. A flow of the invention may have additional steps (not necessarily described in this application), different steps which replace some of the steps presented, fewer steps or a subset of the steps presented, or steps in a different or alternative order than presented, or any combination of these. Certain steps may be repeated as needed. Further, the steps in other implementations of the invention may not be exactly the same as the steps presented and may be modified or altered as appropriate for a particular application or based on the circumstances.

In an implementation, trust for an application program can be established in the following flow:

(1) An application program (or policy enforcement point or PEP) intercepts a request.

(2) The PEP queries a policy deployment point (PDP or policy enforcer) for a decision.

(3) The PDP returns ALLOW.

(4) The PDP caches the application's program identifier (PID), decision and time (this PID is trusted for a period of time from now on).

(5) Encryption driver intercepts a file open (for example, at the file system filter driver).

(6) Encryption driver checks if file is encrypted.

(7) If encrypted, encryption driver reads the file's header to get key ring name and key id (identification information of a key in the key ring). The encryption driver requests a key from PDP with the PID, key ring name, and key id.

(8) PDP performs a lookup on a cache and finds process trusted.

(9) PDP performs a lookup to locate a key store with the key ring using the key ring's name.

(10) If key ring is in key store, get key with key id from key ring and return key to encryption driver.

(11) If key ring is not in key store, request the key ring from Key Management server. Cache key ring in a local key store. Return key with key id to encryption driver.

(12) Encryption driver allows the file to be opened.

(13) Encryption driver stores key with open file handle.

(14) Encryption driver returns.

(15) Encryption driver intercepts a file read on the file handle by PD.

(16) Encryption driver reads data from disk and decrypt.

(17) Encryption driver presents unencrypted data.

(18) If PDP return application is not trusted, encryption driver reads data from disk without decrypting and returns to app.

(19) Otherwise, return error.

Encrypted Document Structure

In the following discussion, a source document refers to a document in its original unencrypted form. The content of a source document is referred to as source content. When a source document is encrypted, the resulting document containing content of the source document in encrypted form is referred to as an encrypted document. The portion of data in the encrypted document that represents the source data in encrypted form is referred to as encrypted data. The data in an encrypted document that is not encrypted data is referred to as control data.

Figure 7:
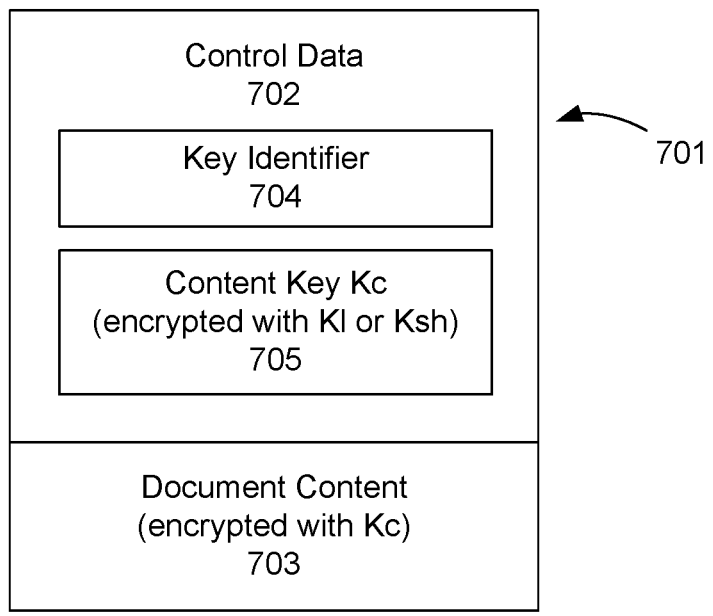
FIG. 7 shows a structure of an encrypted document.

FIG. 7 shows a structure of an encrypted document according to a specific implementation of the invention. An encrypted document 701 includes a control data section 702 and a document content section 703. The document content section has encrypted data which is encrypted using content encryption key (or content key) Kc 705. The control data section holds a key identifier 704, a content encryption key Kc, and other data. The other data may include a magic number, file format signature, version number, key ring name, key identifier, unencrypted file size, padding information, author name, timestamp, tracking rules, retention rules, classification data, custom file attributes (also referred to as ancillary data), and more. The content encryption key Kc is used to decrypt the encrypted data in the document content section. A content encryption key may be generated when a document is encrypted. Therefore, each encrypted document may have a different content encryption key. The content encryption key itself is encrypted. Depending on whether a document is at rest or in motion and when a document is at rest whether the document is on a host computing device or on a shared storage device, a local encryption key Kl or a shared encryption key Ksh may be used to encrypt the content encryption key. Since content encryption key Kc may be encrypted using different encryption keys, a key ring name and a key identifier pair may be used to identify the encryption key that was used to encrypt the content encryption key. A key ring name may be a string value, an integer value, or other value. When a key ring is used, a key identifier may be an index or a name that uniquely identifies an encryption key in a key ring. In one implementation, the key used to encrypt content encryption key Kc is not stored in a key ring. In this case, only a key identifier is necessary to identify a key. A key identifier may be an integer, a string value, or other value.

In an implementation, a feature of the system is that encrypting a document involves two-layers of encryption. A Kc key can protect the document content while a separate key, a Ksh or Kl key, protects the Kc key. So, if changes need to be made to the encryption of a file (e.g., updating policies to prevent people from accessing the document), the Ksh or Kl key can be updated without needing to reencrypt the document contents. For example, if a document is 20 megabytes in size, its key data and associated encryption overhead (such as the Kc) is around 1 kilobytes in size. It is a lot easier to deal with decrypting and re-encrypting 1 kilobytes. The document can even vary in size, but since only the Kc needs to be reencrypted if a new key is used, computing overhead is reduced since the document contents do not need to be reencrypted.

In an implementation, a key identifier is a Universally Unique Identifier (UUID) which uniquely identifies an encryption key. UUID is an identifier standard maintained by the Open Software Foundation®. In another implementation, a key identifier is an integer index into a key ring and a key ring identifier for identifying the key ring is an UUID.

The encrypted document in FIG. 7 is merely illustrative of an embodiment incorporating the present invention and does not limit the scope of the invention as recited in the claims. One of ordinary skill in the art would recognize other variations, modifications, and alternatives. For example, in FIG. 7, the control data section appears before the encrypted data section in an encrypted file. In another implementation, the control data section appears after the encrypted data section in an encrypted file.

To facilitate identifying an encrypted document, an encrypted document may be assigned a custom file name extension (e.g., .nxl). If a custom file name extension may not be used, a magic number (or a signature) may be included in the control data section of the encrypted document for file type identification. For example, if control data is stored as a file header, the first few bytes of the file may contain a signature "NLNXL." With such, an encrypted document may be identified if the first five bytes in a file matches the signature.

In another embodiment of the invention, the control data of an encrypted document is stored in a location different separate from the document content. In an implementation, document content of an encrypted file is stored in the default stream of a file on Microsoft's NTFS® file system and control data of the encrypted file is stored in a separate stream (or alternate stream) of the file. For example, the separate stream can be the resource stream of the file system.

Key Management

A policy enforcer manages multiple encryption keys used to encrypt and decrypt documents. The encryption keys may be local encryption key Kl and shared encryption key Ksh. The discussion from this point onward will focus on the application of local encryption key and shared encryption key. As such, hereinafter "encryption key" refers only to a local encryption key or shared encryption key but not a content encryption key Kc. Hereinafter, any reference to content encryption key will be explicitly stated. In addition, "using a local encryption key to encrypt a document" hereinafter refers to using a local encryption key to encrypt a content encryption key and the content encryption key is used to encrypt the content of a document. Similarly, "using a shared encryption key to encrypt a document" hereinafter refers to using a shared encryption key to encrypt a content encryption key and the content encryption key is used to encrypt the content of a document.

An impediment to create an easy to use transparent encryption solution is key management. While using a large number of encryption keys or changing encryption key frequently increases security and minimizes data loss when an encryption key is compromised, it increases complexity in managing and securing encryption keys. By placing encryption key management at a policy enforcer, the task of managing encryption keys is greatly simplified. At the same time integrating encryption with access control policies offers additional flexibilities in providing automated and targeted document encryption (e.g., a policy may specify to automatically encrypt a document having classification "company secret" when sent as an e-mail) and selective access to decrypted document content.

In an embodiment of the invention, a policy enforcer in an information management system facilitates encryption and decryption of documents using local encryption keys and shared encryption keys distributed from a key management server of the information management system. Encryption keys are managed using key rings. Each key ring is given a unique name and may contain zero or more encryption keys. Each encryption key in a key ring is given a unique identifier. For example, a key ring is used to support key management where an encryption key is changed periodically to minimize data loss in case an encryption key is being compromised. In this example, a key ring name NL_LOCAL refers to a particular local encryption key collection. When a local encryption key is requested for encrypting a document, the newest key in key ring NL_LOCAL is returned. However, when requesting a local decryption key to decrypt a document, the request should contain a key ring name (i.e., NL_LOCAL) and a key identifier that identifies a particular key in the key ring.

Regarding local encryption key distribution, a particular local encryption key ring is distributed to only a particular policy enforcer. No other policy enforcer will be given the particular local encryption key ring. Therefore, a local encryption key is unique to a policy enforcer.

In an implementation, a shared encryption key ring may be distributed to many policy enforcers in the information management system. When an encryption service requests a particular shared key from the policy enforcer, the policy enforcer returns a particular shared key from its key ring cache if the corresponding shared key ring exists in the cache. If a shared key ring is not cached, policy enforcer requests the shared key ring from another source (e.g., key management server).

A key management server may also assist in recovering local encryption key ring assigned to a policy enforcer in case of system or hardware failure.

In a particular implementation, a local encryption key may be generated on the host computing device whereby local encryption key distribution by the key management server is not necessary. Optionally, a key management server may participate in backup and restore of locally generated local encryption key.

Figure 8:
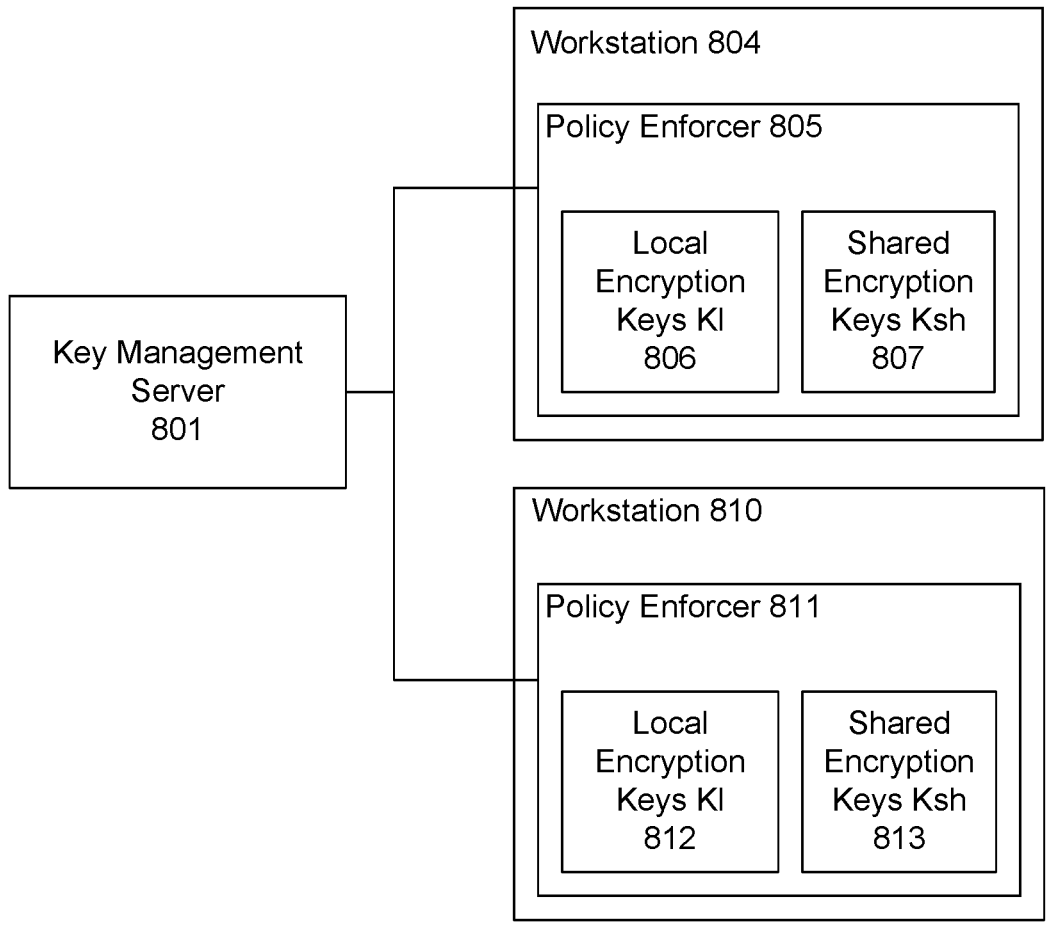
FIG. 8 shows a key management server that manages encryption keys used by a plurality of policy enforcers.

FIG. 8 shows a key management server 801 that manages encryption keys used by a plurality of policy enforcers of an information management system. The key management server communicates with policy enforcers 805, 811 on workstation 804 and file server 810, respectively. Policy enforcer 805 holds one local encryption key ring Kl 806 and one or more shared encryption key rings Ksh 807. Similarly, policy enforcer 811 holds one local encryption key ring Kl 812 and one or more shared encryption key rings Ksh 813.

One purpose of a local encryption key is to protect documents on a computing device (also referred to as "local documents") that are not being accessed outside of the computing device. A local document is a document stored on a storage device attached to a computing device (also referred to as "a document stored on computing device" in this document) and the document is not accessible from another computing device. In an implementation, a local encryption key is generated locally by a policy enforcer and registered with a key management server. Local encryption key is registered with a key management server to facilitate key recovery. In another implementation, a local encryption key is generated by a key management server and distributed to a policy enforcer. A local encryption key generated by a key management server is distributed to one policy enforcer only and the local encryption key is not shared with another policy enforcer.

In an implementation, a shared encryption key is generated by a key management server. The shared encryption key may be distributed to two or more policy enforcers. A purpose of a shared encryption key is to allow a document encrypted by a policy enforcer on one computing device to be decrypted by another policy enforcer on another computing device.

A policy enforcer may operate without a key management server. A key management server is used to simplify encryption key management. In an implementation, a policy enforcer generates its local encryption key and shared encryption keys are installed manually on a computing device.

Local Encryption Key

A local encryption key is an encryption key that a policy enforcer uses to encrypt documents stored on storage devices directly attached to the policy enforcer's host computing device (also referred to as "documents stored on the host computing device") and access to the documents are limited to the host computing device. Since the documents stored on the host computing device are accessible only by the host computing device, it is unnecessary to share a local encryption key with other policy enforcers. A local encryption key may be used to encrypt documents at rest.

In an implementation, each policy enforcer in an information management system has at least one local encryption key in a local encryption key ring. By using a different local encryption key on each policy enforcer, the number of documents encrypted using a particular local encryption key is likely to be limited, whereby lessening the impact of data loss due to a local encryption key being compromised. When a local encryption key is changed frequently, the impact of data loss may be further limited.

A local encryption key may be designed to protect documents that are not being shared, and may be used by policy enforcers on endpoint computing devices to protect local documents. An endpoint computing device refers to a networked computing device that is used mostly to access data on other computing devices, and the computing device itself is not (or seldom) being accessed by another computing device. Example endpoint computing devices include desktop computers, laptop computers, tablet computers, smartphones, digital information kiosks, and more.

Shared Encryption Key

While a local encryption key may be used for encrypting documents that will only be decrypted on the same computing device by an encryption service in conjunction with a policy enforcer, a shared encryption key may be used to encrypt a document on a first computing device by a first encryption service in conjunction with a first policy enforcer that will be decrypted on second computing device by a second encryption service in conjunction with a second policy enforcer. A shared encryption key is an encryption key that may be provided to one or more policy enforcers to encrypt and decrypt documents. A policy enforcer provides a shared encryption key to encrypt a document if the document may be decrypted by another computing device (e.g., a document attached to an e-mail).

There are many situations where encrypting a document using a shared encryption key is desirable. Examples of situations include: (a) a document is intended to be shared on the network or through removable storage device; (b) a document needs to be protected while copied (or transferred, or downloaded) over an unsecure network connection; or (c) a document needs to be secured while being sent as an e-mail.

In the context of the present invention where documents are encrypted and decrypted by a policy enforcer at the point-of-use and encryption keys are maintained by the policy enforcer, sharing an encrypted document refers to providing a policy enforcer at the point-of-use the encryption key necessary to decrypt the encrypted document. A point-of-use refers to a computing device from which access to a document is requested or on which the content of a document will be read (or consumed). By decrypting an encrypted document at the point-of-use, the encrypted document remains protected while transmitted over an unsecured network connection whereby providing end-to-end protection on document content.

In an implementation, a shared encryption key is assigned to a server computing device (hereinafter also referred to as "document server") where at least one encrypted document (hereinafter also referred to as "shared documents") on the server computing device is accessible from one of more client computing devices (hereinafter also referred to as "clients"). The shared documents on the document server are encrypted with the shared encryption key. Not all documents on the document server may be encrypted. When a shared document is accessed from a client and the client is authorized to access the shared document, the content of the shared document is transferred to the client and the shared document remains encrypted during transfer. At the client, a policy enforcer obtains the shared encryption key associated with the document and decrypts the shared document using the shared encryption key. The shared encryption key is typically identified by a key ring name and a key identifier stored with the document.

If a shared document is changed at a client, the policy enforcer at the client encrypts the content of the shared document using the shared encryption key and saves the encrypted data to the document server. Again, the changed shared document is encrypted while it is transmitted from the client to the document server.

Accessing an Encrypted Document

In an embodiment of the invention, a policy enforcer and an encryption service cooperate to offer two views of an encrypted document. If a first application program is trusted by a policy enforcer that it will continue to protect the unencrypted content of an encrypted document, the encryption service will decrypt the encrypted document to produce the unencrypted content and provide it to the first application program. If a second application program is not trusted by a policy enforcer to protect unencrypted content, the encryption service will serve the second application program with encrypted content (e.g., original content of the encrypted document that has not been decrypted). For example, if the first application program is a word processor such as Microsoft Word® and the second application program is data backup software. In an implementation, the trust a policy enforcer places on an application program may expire after a time period.

In an example, an application program trusted by a policy enforcer when it attempts to access a first encrypted document at a first time X whereby unencrypted content of the first encrypted document is served by an encryption service working with the policy enforcer. At a later time Y, when the application program attempts to access the first encrypted document, the application program is not trusted by the policy enforcer. So encrypted content is served by the encryption service to the application program. In one scenario, the application program is a spreadsheet software such as Microsoft Excel® and at time X, the application program is operated by user A, where the policy enforcer determines who can be trusted according to information management policies. At time Y, the application program is operated by user B who is not trusted by the policy enforcer.

In an implementation, access to a document includes the following file operations: opening a file, creating a file, reading a file, writing a file, renaming a file, moving a file, copying a file, or the like.

Examples of a server computing device include a file server, a document management server, a content management server, a Web server, a workstation with a shared folder, and more. Examples of a client computing device include a desktop computer, a laptop computer, a tablet computer, a smartphone, and more.

In example 5 below, a policy specifies that all documents created in local directory "/company-secrets/" will be encrypted.

Example 5

FOR document.name="/company-secrets/*"
ON SAVE
BY user=Employees
DO ENCRYPT

Figure 9:
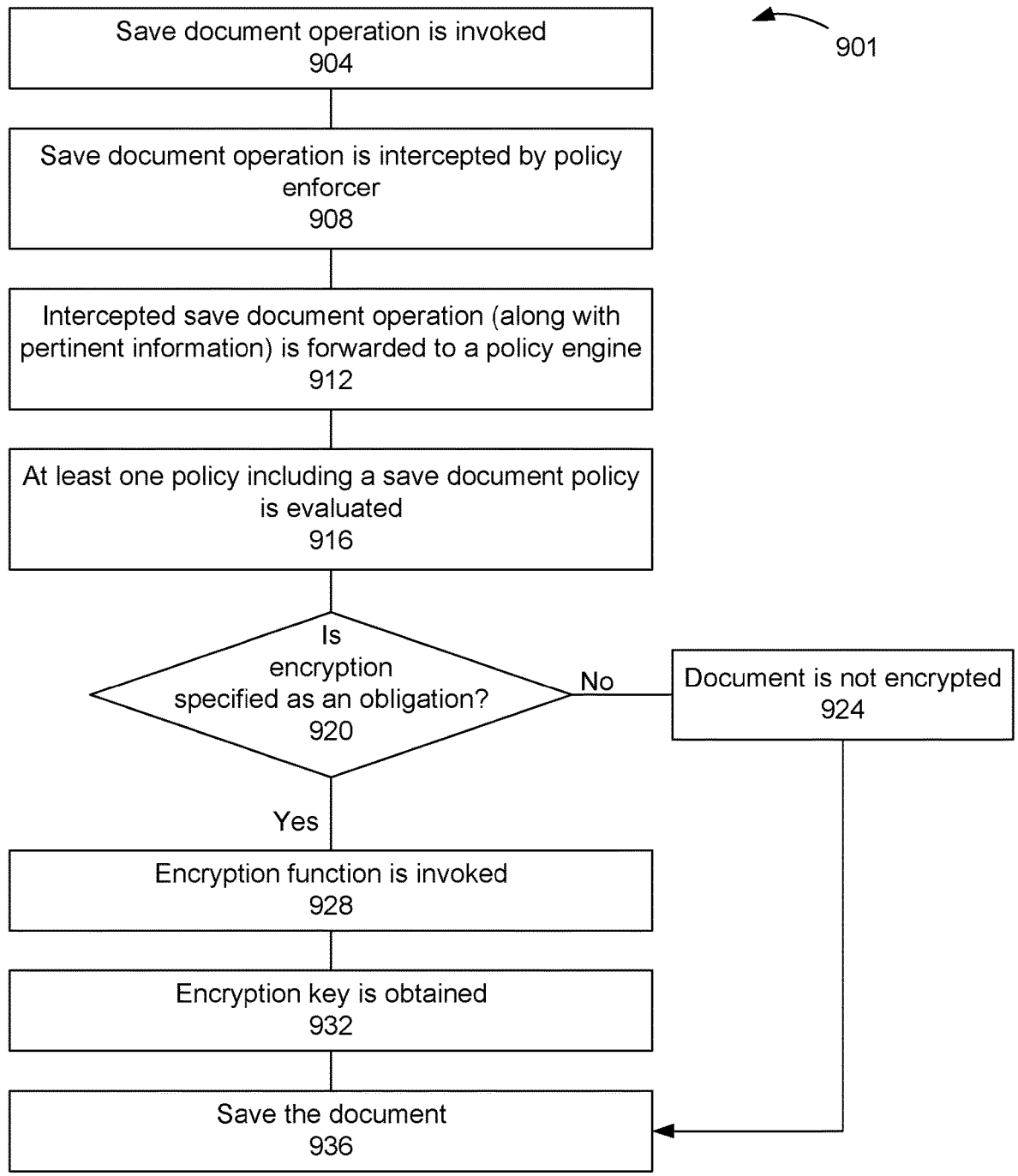
FIG. 9 shows a flow for encrypting a new document using local encryption key.

FIG. 9 shows a flow 901 for encrypting a new document using a local encryption key according to a specific implementation of the invention. In a step 904, a "save document" operation is invoked. The save operation on the document may be invoked in a number of ways. For example, a user may invoke this operation by saving a document to a local directory (e.g., "/company-secrets/") on a computer's local hard disk. This may be done, for example, by clicking on an icon, by typing in an appropriate command in a command line, by selecting a menu item (e.g., "File" and then "Save As . . . "), by entering shortcut key sequence (e.g., <Ctrl>-S), or by an application program. In an implementation, the user saves the document in the local directory for the first time.

In a step 908, the save operation is intercepted (or detected) by a policy enforcer on the computer. In a step 912, the policy enforcer forwards the save document operation, along with other information related to the save document operation, to a policy engine. In a step 916, the policy engine evaluates at least one policy on the operation including a save document policy. In an implementation, the policy is a declarative policy. In a step 920, it is determined whether the policy specifies an obligation to encrypt the document. In a step 924, if it is determined that the policy does not specify an obligation to encrypt the document, the document is not encrypted. Process flow then proceeds to a step 936, in which the unencrypted document is saved in the directory.

If it is determined that the policy does specify an obligation to encrypt the document, the document is encrypted. In a step 928, an encryption function is invoked. In a step 932, an encryption key is obtained. After the document is encrypted, in a step 936, the encrypted document is saved in the directory. In one implementation, encryption is implemented at block level whereby a block of data is encrypted and saved to disk before another block of data is encrypted. In one implementation, the name of an encrypted file is unchanged. In another implementation, the name of an encrypted file is changed to reflect content of the file has been encrypted. In an implementation, an obligation handler invokes the encryption function in the encryption service add-on to encrypt the document. To encrypt the document the encryption service add-on requests an encryption key from the policy enforcer. In another implementation, the encryption service add-on obtains a key from a configuration file or a database.

In an implementation, an encryption service may request a local encryption key using a key ring name that is predefined. In another implementation, an encryption service may request a local encryption key using a key ring name that is specified in a configuration file. In yet another implementation, an encryption service may request a local encryption key using a key ring name that is specified in a policy.

Figure 10:
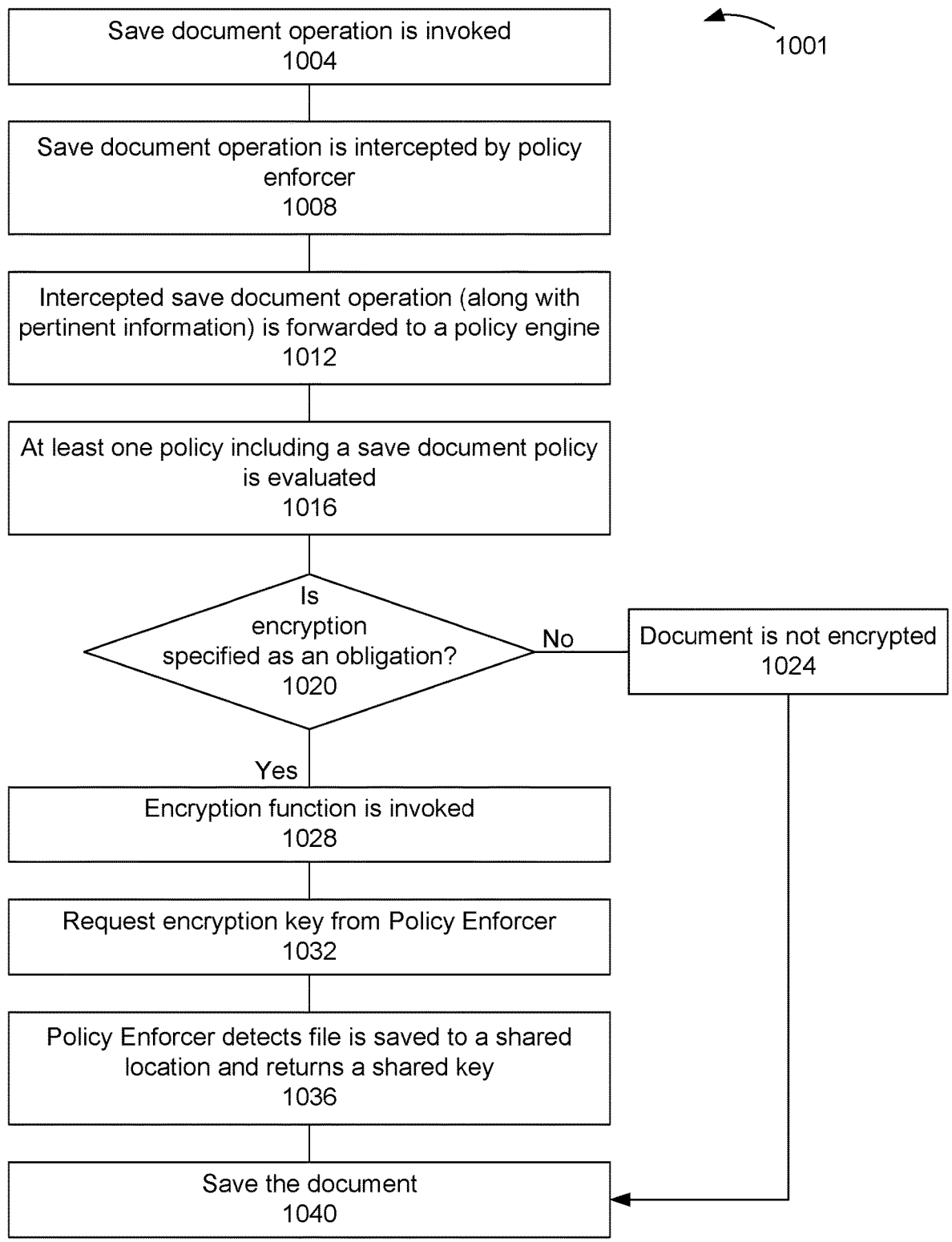
FIG. 10 shows a flow for encrypting a new document using a shared encryption key.

FIG. 10 shows a flow 1001 for encrypting a new document using a shared encryption key according to a specific implementation of the invention. In a step 1004, a save document operation is invoked by a user or an application program. A policy enforcer intercepted the save document operation in a step 1008. In a step 1012, the save operation and information related to the save operation is forwarded to policy engine. Policy engine evaluates one or more policies relevant to the save document operation in a step 1016. Based on the result of policy evaluation, the policy engine determines if an encryption obligation needs to be invoked in a step 1020. If the policy engine determines the document does not need to be encrypted in a step 1024, the document is saved without encryption in a step 1036. If the policy engine determines the document needs to be encrypted, encryption service is invoked in a step 1028 and the encryption service requests a key from policy enforcer in a step 1032. The policy enforcer detects if the document is saved to a shared location and returns a shared encryption key if the save location is shared in a step 1036. Some examples of shared locations include: (a) a directory on a file server; (b) a directory on a local computer that is being shared (i.e., accessible by another user through the network); (c) a directory accessible through a web server; or (d) a directory on a removable device. If the policy enforcer detects the save location is local and is not being shared, the policy enforcer returns a local encryption key. In a step 1040, the encrypted document is being saved.

In an implementation, an encryption service may request a shared encryption key using a key ring name that is specified in a configuration file. In another implementation, an encryption service may request a local encryption key using a key ring name associated with a directory. In yet another implementation, an encryption service may request a local encryption key using a key ring name that is specified in a policy.

Figure 11:
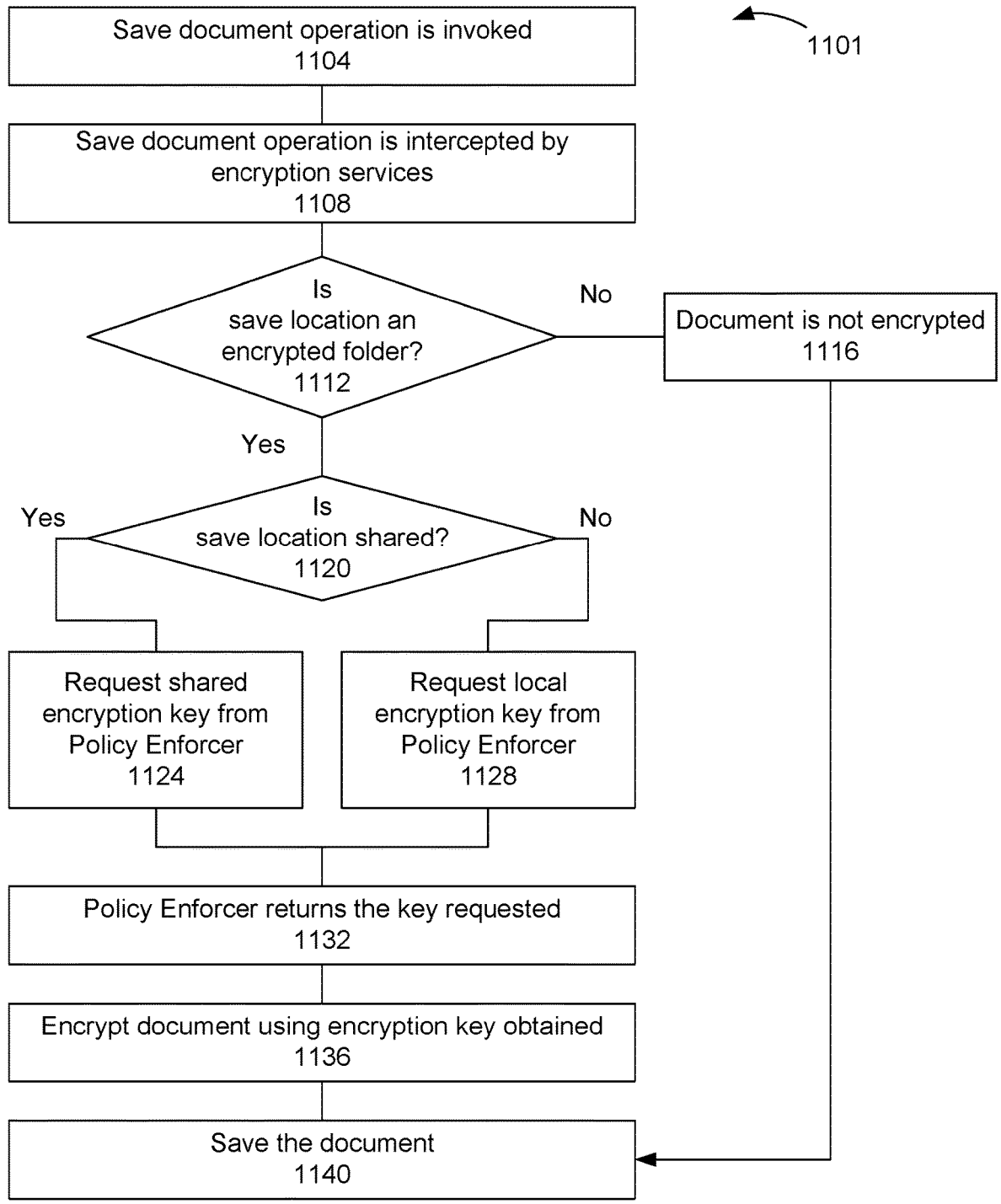
FIG. 11 shows a flow for encrypting a document without using a policy.

FIG. 11 shows a flow 1101 for encrypting a document without using a policy. In a step 1104, a save document operation is invoked by a user or an application program. An encryption service intercepts the save document operation in a step 1108. In a step 1112, the encryption service checks if the document is saved to an encryption folder. An encryption folder is a directory with an encryption required attribute set to true. In a step 1116, encryption service determined the document is not saved to an encrypted folder, and proceeds to save the document in a step 1140. In a step 1120, encryption service determines the document is saved to an encrypted folder. In addition, the encryption service makes a determination whether the save location is shared. If the save location is shared, the encryption service request a shared encryption key from the policy enforcer in a step 1124. If the save location is not shared, the encryption service request a local encryption key from the policy enforcer in a step 1128. The policy enforcer responds to a key request from the encryption server in a step 1132 and returns a corresponding encryption key. In a step 1136, the encryption service encrypts the document using an encryption key obtained from the policy enforcer and the encrypted document is saved in a step 1140.

In an implementation, an encryption service may request a shared key using a key ring name specified in a configuration file. In another implementation, an encryption service may request a share key using a key ring name associated with a particular directory. In an implementation, an encryption service may always encrypted documents with shared keys.

Besides having encryption carried out automatically, encryption may be performed manually by a user using an encryption tool (e.g., NextLabs® nlSystemEncryption.exe). An encryption tool communicates with an encryption service to encrypt a document. The encryption service requests a key from the policy server and encrypts the document using the encryption key.

Figure 12:
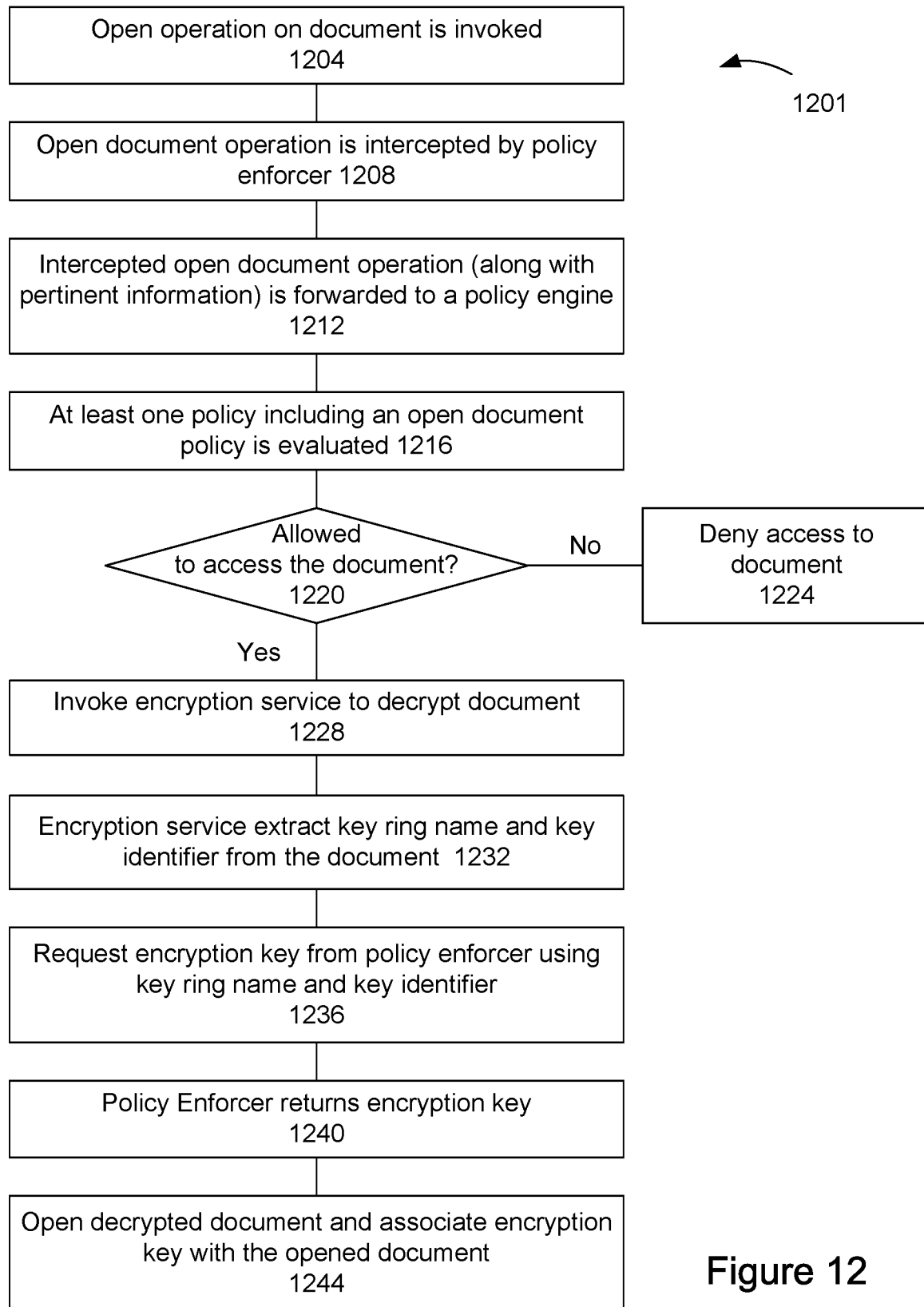
FIG. 12 shows a flow for decrypting a document using local encryption key.

FIG. 12 shows a flow 1201 for decrypting a document where decryption is initiated by a policy enforcer and encryption is completed with the assistance of an encryption service add-on. In a step 1204, a user opens a document that is encrypted. For example, referring to example 5 above, the documents in "/company-secrets/" on a computer's local hard disk are encrypted. In a step 1208, the open document operation is intercepted by a policy enforcer on the computer. In a step 1212, the policy enforcer forwards the open document operation, along with other information related to the open document operation, to a policy engine. This related information can include identifying information (e.g., who the user is, what device is being used, what time the open operation occurs, what file is being opened, application identifying information) and other information. In a step 1216, the policy engine evaluates at least one policy related to the operation, including an open document policy. In an implementation, the policy is a declarative policy. In a step 1220, the results of policy evaluation determines if access to the document is allowed. In a step 1224, access to a document is denied. The open document operation fails. In a step 1228, access to a document is allowed. The policy enforcer invokes encryption service to decrypt the document. In a step 1232, the encryption service extracts key ring name and key identifier from header of the document. In other implementations, the key ring name and key identifier may be stored at the end of an encrypted document, other parts of a document, or outside a document (e.g., a NTFS® stream). In a step 1236, the encryption service requests an encryption key from a policy enforcer using the key ring name and key identifier. In a step 1240, the policy enforcer returns an encryption key to the encryption service. In a step 1244, the encryption service opens the document and associates the encryption key with the opened document. Subsequent read operations can use the same encryption key to decrypt the data. In another implementation, the key can only be used to decrypt the data for a limited amount of times (e.g., 1 time, 2 times, or other integer amount) or when a condition is satisfied (e.g., before a certain time, after a certain time, whether a device is approved device, or a combination of these). In the case an encryption key cannot be located using the key ring name and key identifier, the policy enforcer returns an error status in step 1240. The encryption service allows the file open operation to complete without further intervention and subsequent file read operation will return encrypted data to the application program.

Figure 13:
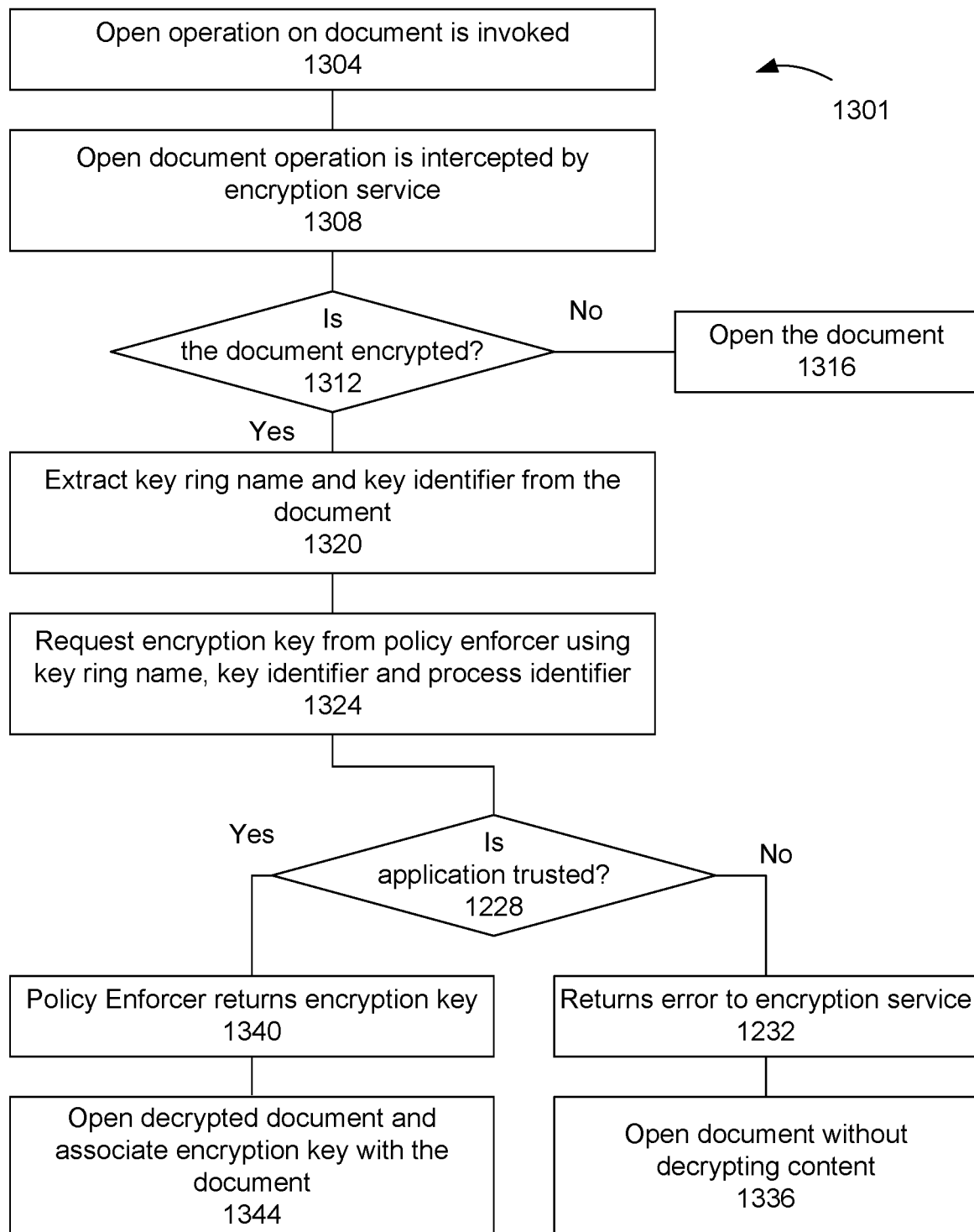
FIG. 13 shows a flow for decrypting a document where decryption is initiated by an encryption service and encryption is completed with assistance from a policy enforcer.

FIG. 13 shows a flow 1301 for decrypting a document where decryption is initiated by an encryption service and encryption is completed with assistance from a policy enforcer. In a step 1304, a user opens a document that is encrypted. In a step 1308, the open document operation is intercepted by an encryption service on the computer. In a step 1312, the encryption service checks if the document is encrypted. In a step 1316, encryption service determined the document is not encrypted and the document is opened without further intervention from the encryption service. In a step 1320, the document is encrypted and the encryption service extracts key ring name and key identifier from the document. Key ring name and key identifier may be stored in the encrypted document or associated with the encrypted document. In a step 1324, the encryption service requests a key from the policy enforcer using the key ring name, key identifier, and a process identifier of the application program that initiated the open file operation. In a step 1328, the policy enforcer determines if the application program that initiated the open file operation should be trusted. The policy enforcer identifies the application program using the process identifier provided. The policy enforcer may also examine if the application program has made a policy evaluation request recently and if the policy effect was allowed. If there was a recent policy evaluation associated with the application program and policy effect was allowed, then the application program is trusted. In a step 1232, an application program is determined to not be trusted and policy enforcer returns an error status to the encryption service. In a step 1336, the encryption service allows the file open operation to complete without further intervention and the contents of the document will remain encrypted (i.e., the application program will get encrypted data). In a step 1340, the policy enforcer determined the application program can be trusted, and it returns an encryption key to the encryption service. In step 1344, the encryption service opens that document and associates the encryption key with the document. Subsequent read operation may use the encryption key to decrypt contents of the document.

Figure 14:
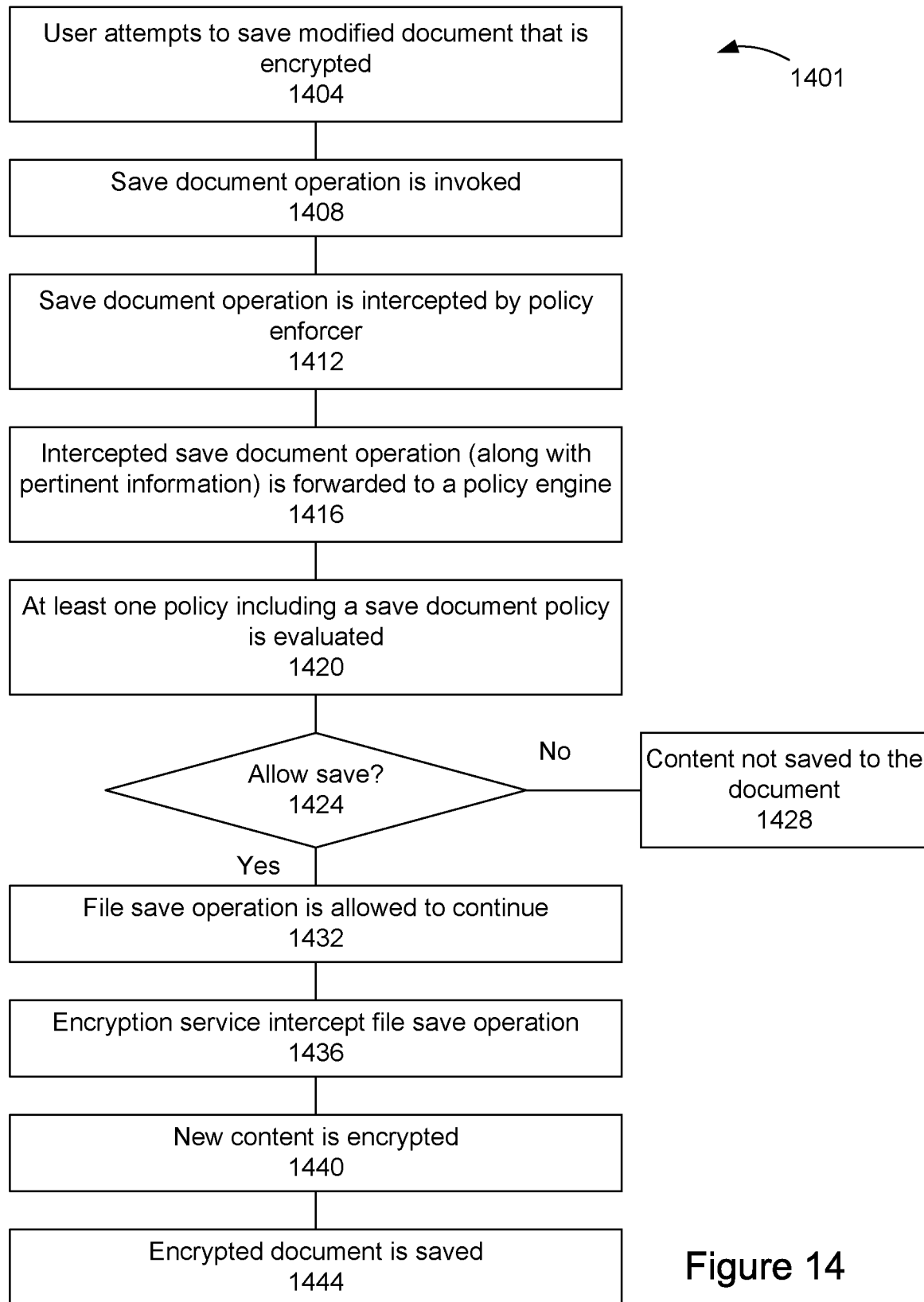
FIG. 14 shows a flow for encrypting a document using local encryption key after the document is modified.

FIG. 14 shows a flow 1401 for re-encrypting document content after a document is modified. In a step 1404, a user attempts to save a modified document that is encrypted. For example referring to the policy above, a user modifies a document in "/company-secrets/" on a computer's local hard disk. In a step 1408, the save document operation is invoked, and in a step 1412, the save document operation is intercepted by a policy enforcer on the computer. In a step 1416, the policy enforcer forwards the save document operation, along with other information related to the save document operation, to a policy engine. In a step 1420, the policy engine evaluates at least one policy on the operation including a save document policy. In an implementation, the policy is a declarative policy. In a step 1424, policy enforcer checks if the save operation is allowed. In a step 1428, the save operation is denied and content is not saved to the document. In a step 1432, policy enforcer allows a save operation to continue. In a step 1436, the save operation is intercepted by encryption services. Since file save operation is not blocked by policy enforcer, encryption service encrypts the document in a step 1440. This encryption step may use an encryption key used to decrypt the document or obtain a new encryption key from the policy enforcer. The encryption used may be a local encryption key or a shared encryption key. In a step 1444, the encrypted document is saved on the computer.

A policy enforcer plays an important role in keeping encryption key management simple. The policy enforcer is also critical in making encryption and decryption transparent to a user. In an example, when an encrypted document that is encrypted using a local encryption key is copied (or transferred, or uploaded) from an endpoint computing device to a document server, a policy enforcer can determine through policy that the copy operation also needs to make the destination document accessible to other users authorized to access the document. In this case, the policy enforcer may instruct the encryption service to re-encrypt the document using a shared encryption key. In an implementation, a policy enforcer can determine if a copy destination is shared using policies and facilitate encryption key switching through an obligation.

In an implementation, where there is switching between local and shared encryption keys, decrypting a document refers to decrypting content encryption key (Kc) and control data. Contents in the document that is encrypted using content encryption key Kc is unchanged. Similarly, in an implementation, encrypting a document refers to encrypting content encryption key Kc and control data. Contents of the document remains unchanged.

Figure 15:
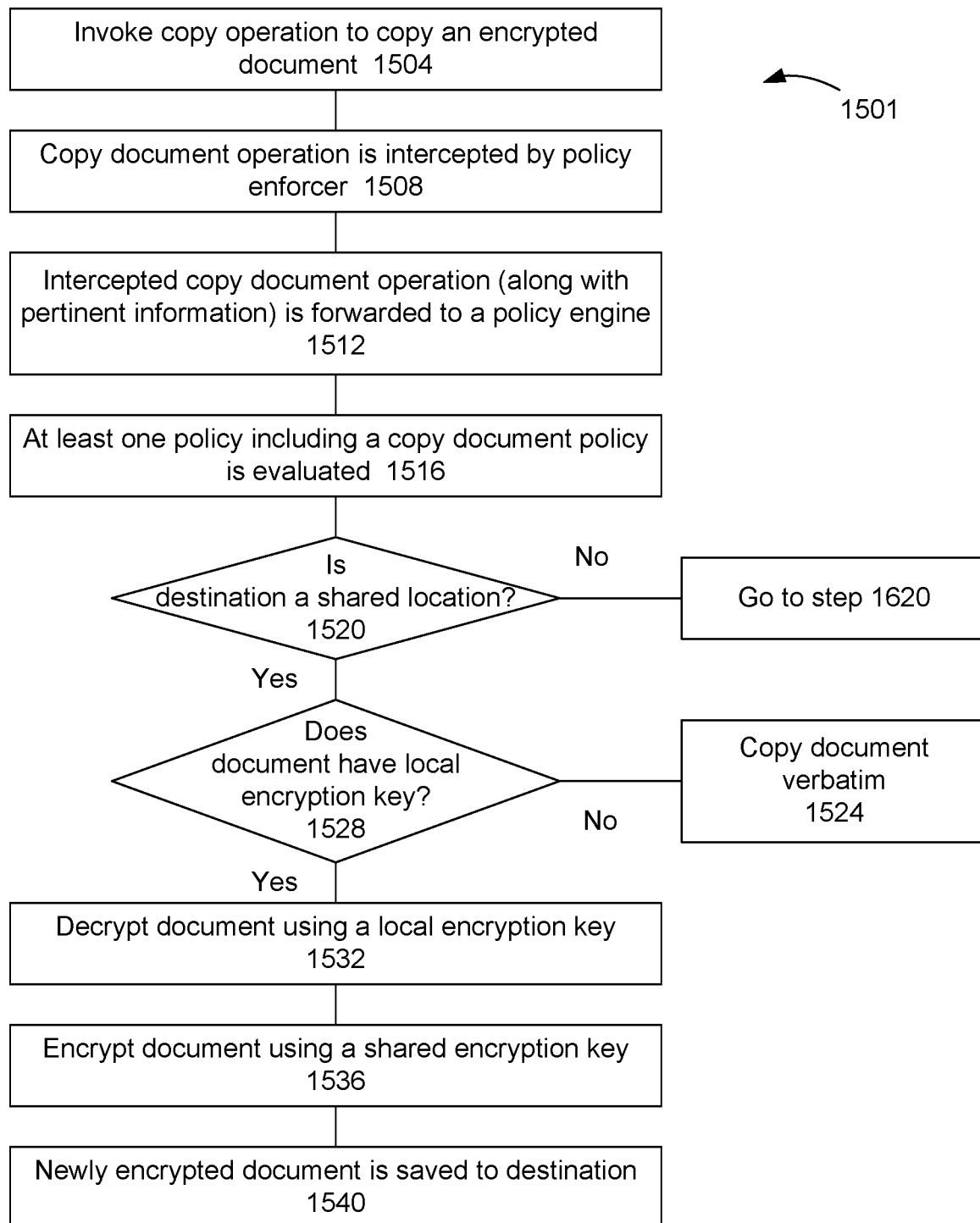
FIG. 15 shows a flow for switching from a local encryption key to a shared encryption key when an encrypted document is copied from an endpoint to a file server.

FIG. 15 shows a flow 1501 for switching from a local encryption key to a shared encryption key when an encrypted document is copied from a local computer to a file server or any shared location. A shared location includes a file server, a remote computer, a shared folder on local computer, or a removable storage device. In a step 1504, a copy operation is invoked when an encrypted document is copied from a local computer to a file server. In a step 1508, the copy document operation is intercepted by a policy enforcer on the local computer. In a step 1512, the policy enforcer forwards the copy document operation, along with other information related to the copy document operation, to a policy engine. In a step 1516, the policy engine evaluates at least one policy on the operation including a copy document policy. In an implementation, the policy is a declarative policy.

In a step 1520, the policy enforcer checks if the copy destination is a shared location by examining the destination of the copy operation. If the copy destination is not a shared location, the policy enforcer continues at flow step 1620 of FIG. 16. In a step 1528, the policy enforcer determined the destination is a shared location, it then examines the document to determine if it is encrypted with a local encryption key. If the document is not encrypted with a local encryption key, the document is copied to the destination without any change in step 1524. In a step 1532, the policy enforcer determined the document is encrypted using a local encryption key. It decrypts the document using a local encryption key. In a step 1536, the decrypted data is re-encrypted using a shared encryption key. In a step 1540, the newly encrypted document including the re-encrypted data is saved to the destination whereby creating a second rendition of the document at the destination. The second rendition of the encrypted document remains encrypted while it is transmitted from the local computing device to the destination.

Figure 16:
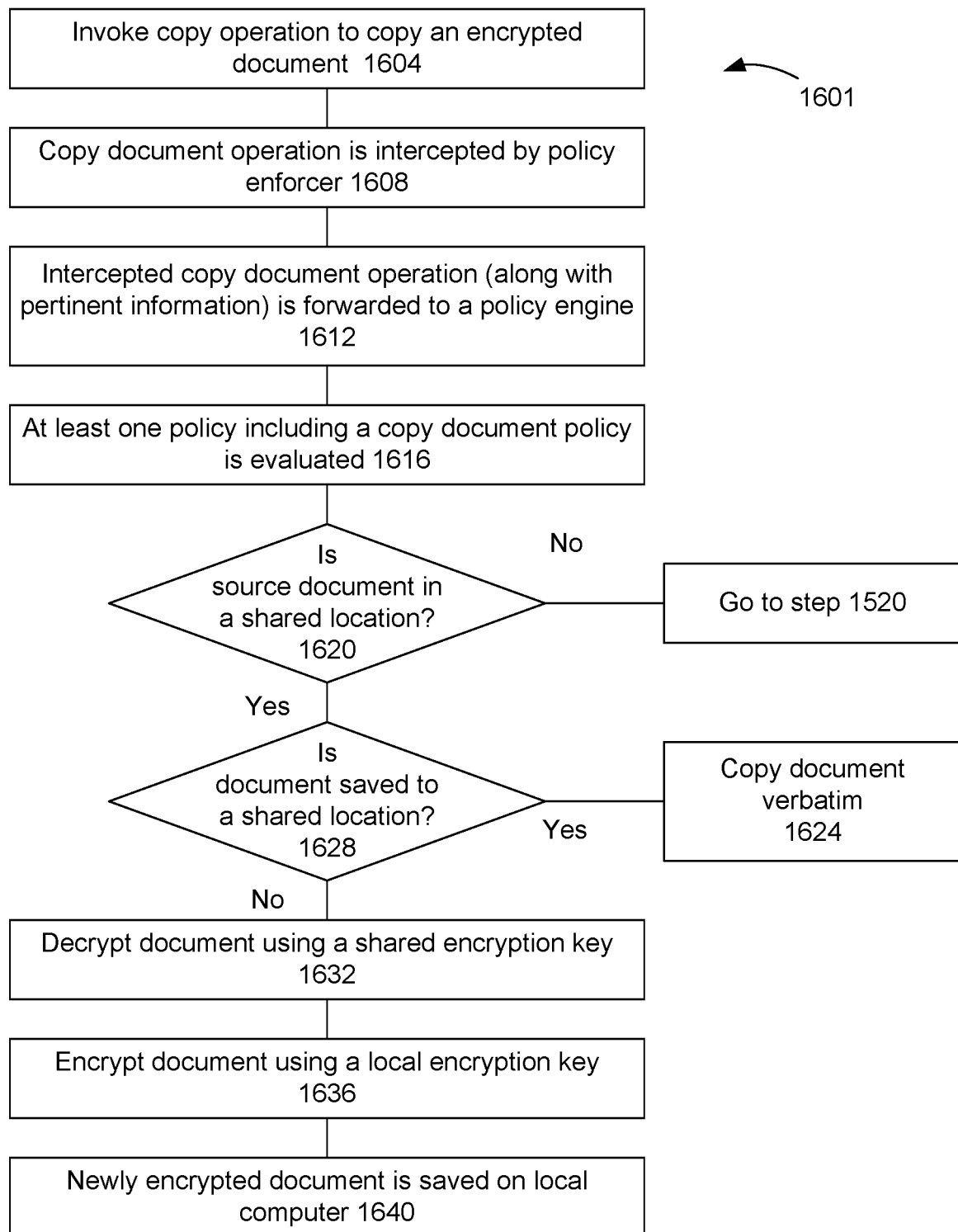
FIG. 16 shows a flow for switching from a shared encryption key to a local encryption key when an encrypted document is copied from a file server to an endpoint.

In an example, an encrypted document on a file server is copied to a desktop computer. FIG. 16 shows a flow 1601 for switching from a shared encryption key to a local encryption key when an encrypted document is copied from a file server or any shared location to a local computer. A shared location includes a file server, a remote computer, a shared folder on local computer, or a removable storage device. In a step 1604, a copy operation is invoked when an encrypted document is copied from a file server to a local computer. In a step 1608, the copy document operation is intercepted by a policy enforcer on the local computer. In a step 1612, the policy enforcer forwards the copy document operation, along with other information related to the copy document operation, to a policy engine. In a step 1616, the policy engine evaluates at least one policy on the operation including a copy document policy. In an implementation, the policy is a declarative policy.

In a step 1620, the policy enforcer checks if the source document is in shared location by examining the source path of the copy operation. If the source path does not represent a shared location, the policy enforcer continues to flow step 1520 of FIG. 15. In a step 1628, the policy enforcer has determined the source path represents a shared location. It then examines the destination path to identify if the destination is a shared location. If the destination represents a shared location, the document is copied to the destination without any change in step 1624. In a step 1632, the policy enforcer determined the destination path is not a shared location. It decrypts the document using a shared encryption key. In a step 1636, the decrypted data is re-encrypted using a local encryption key. In a step 1640, the newly encrypted document including the re-encrypted data is saved to the destination whereby creating a second rendition of the document at the destination. The second rendition of the encrypted document remains encrypted while it is transmitted from the shared location to the local computer.

In example 6 below, if an employee sends an e-mail with a document and the classification of the document is "Confidential," a declarative policy instructs the policy enforcer to encrypt the document.

Example 6

Figure 17:
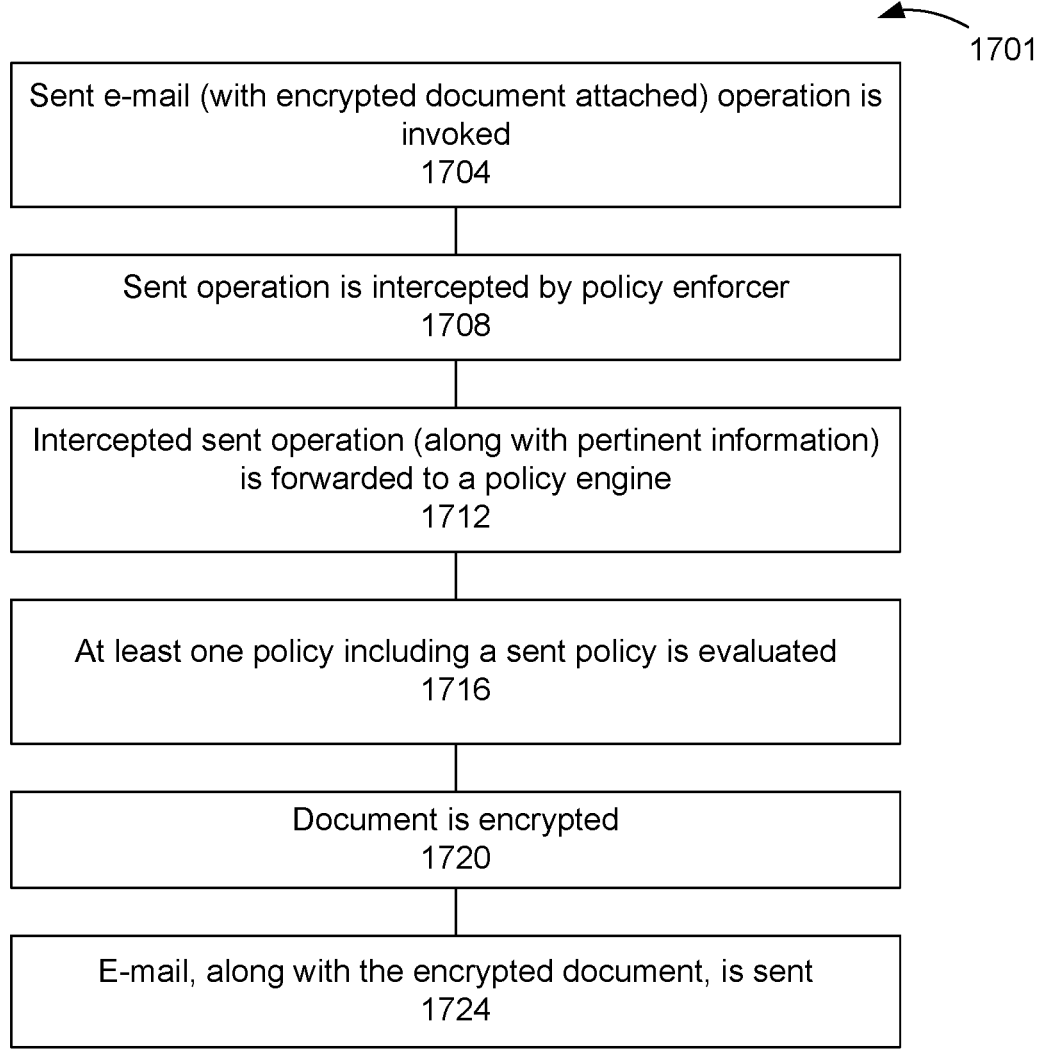
FIG. 17 shows a flow for encrypting an of an e-mail.

FOR email.recipient="*"
WITH (email..classification="Confidential")
ON SEND
BY user=Employees
DO ENCRYPT In an example, an e-mail is sent with an encrypted document attached to it. FIG. 17 shows a flow 1701 for encrypting an of an e-mail. In a step 1704, an e-mail send operation is invoked. For example, this operation is invoked when a user sends an e-mail and the e-mail has an encrypted document attached. In a step 1708, the sent operation is intercepted by a policy enforcer on the desktop computer. In a step 1712, the policy enforcer forwards the sent operation, along with other information related to the sent operation, to a policy engine. In a step 1716, the policy engine evaluates at least one policy on the operation including a sent operation policy. In an implementation, the policy is a declarative policy. In a step 1720, the document is encrypted before the e-mail is sent. In an implementation, a policy directs a policy enforcer to encrypt the document before allowing the e-mail to be sent. In another implementation, a policy enforcer encrypts a document before the document is attached to an e-mail. In this case, the document is encrypted using a shared encryption key obtained from the policy enforcer. In a step 1724, the e-mail, along with the encrypted document, is sent. In an implementation, the encrypted document remains encrypted while attached to an e-mail. As a result, the encrypted document is secured while being sent as an e-mail.

In one implementation, a policy enforcer determines if an e-mail needs to be encrypted based on classification data associated with a document. Classification data includes attributes associated with a document, or attributes derived from content of the document. For example, attributes associated with a document may include file owner or path. Attributes derived from a document may include content analysis such as whether the document contains private information, or the type of the content (e.g., source code, chart data, financial data). These documents may be encrypted by using an encryption obligation.

Figure 18:
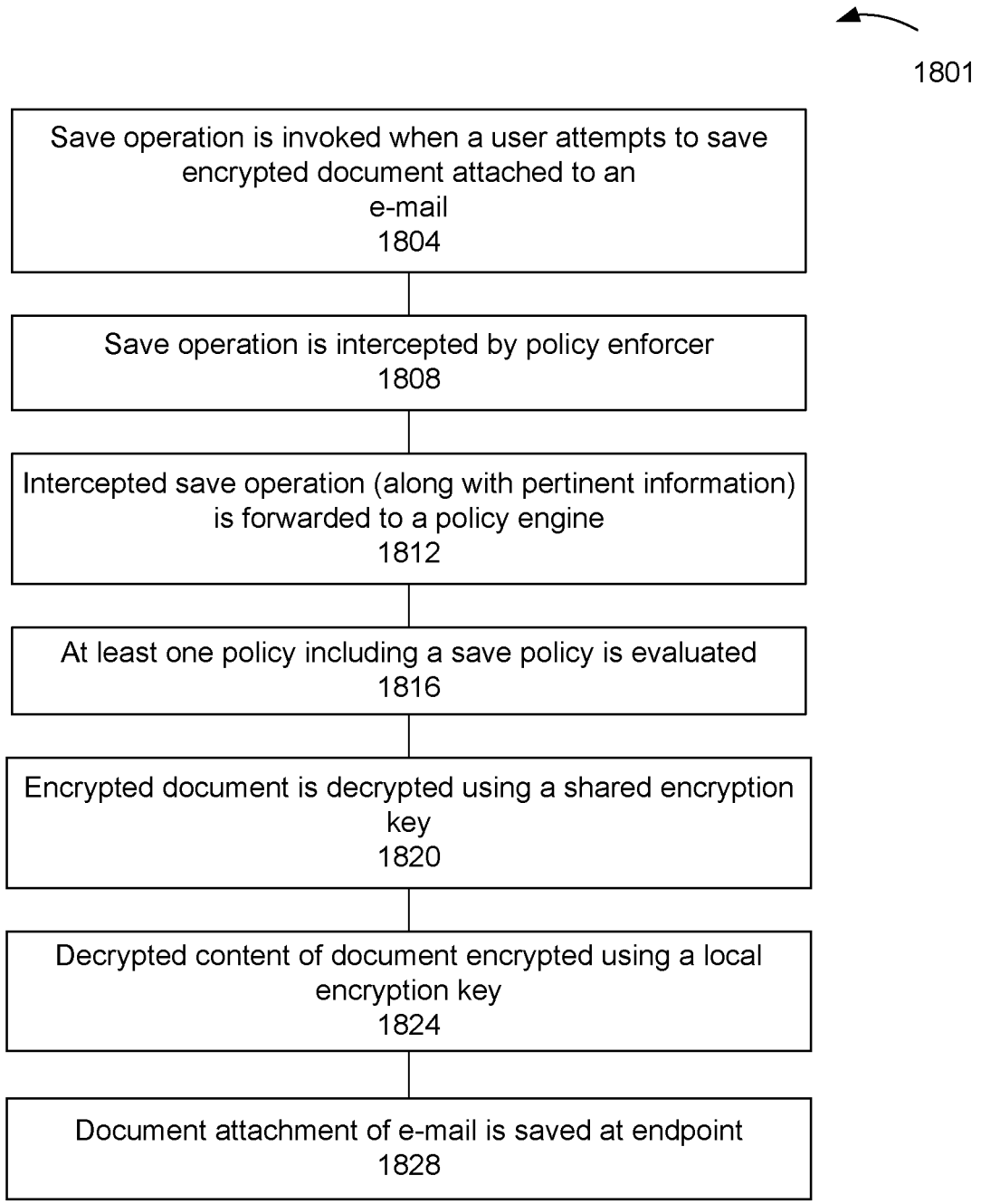
FIG. 18 shows a flow for switching from a shared encryption key to a local encryption key when an of an e-mail is saved to local storage at an endpoint.

In an example, an encrypted document attached to an e-mail is being saved to a local disk of a desktop computer. FIG. 18 shows a flow 1801 for switching from a shared encryption key to a local encryption key when an of an e-mail is saved to local storage of a local computer. In a step 1804, a save operation is invoked when a user attempts to save an encrypted document attached to an e-mail to a hard disk on a desktop computer. In a step 1808, the save operation is intercepted by a policy enforcer on the desktop computer. In a step 1812, the intercepted save operation, along with pertinent information, is forwarded to a policy engine. In a step 1816, at least one policy including a save policy is evaluated. The save operation is allowed by the policy enforcer. In a step 1820, the document is decrypted using the shared encryption key. In a step 1824, the decrypted document is encrypted using the local encryption key. After the document is encrypted using the local encryption key, in a step 1828, the encrypted document attached to the e-mail is saved on the local disk of the desktop computer.

Figure 19:
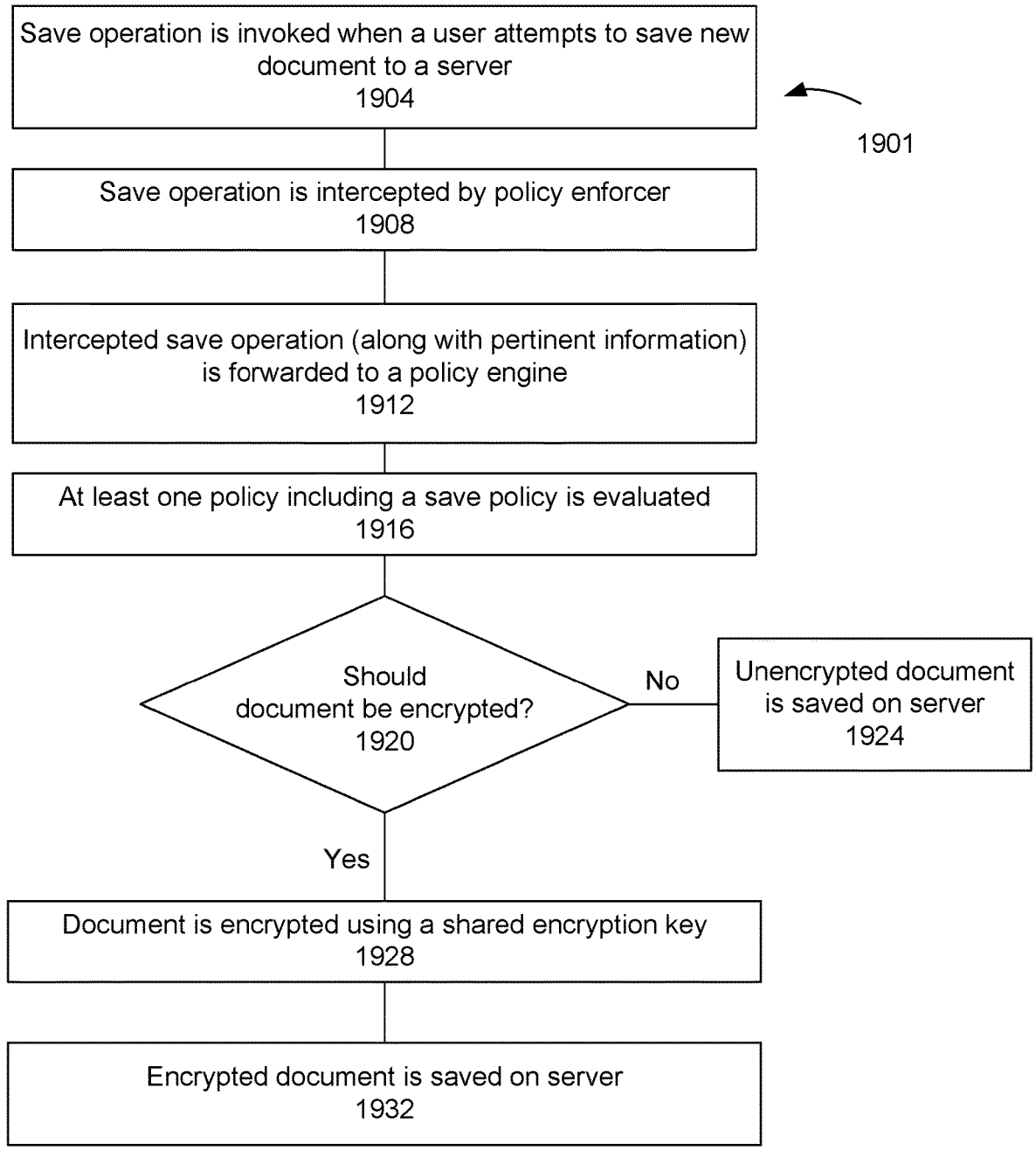
FIG. 19 shows a flow for encrypting a new document to be saved on a file server using a shared encryption key at an endpoint.

In an example, a user attempts to save a new document to a file server location that requires the document to be encrypted. FIG. 19 shows a flow 1901 for encrypting a new document to be saved on a file server using a shared encryption key at a local computer. In a step 1904, a save operation is invoked when a user attempts to save a new document to a file server. In a step 1908, the save operation is intercepted by a policy enforcer on the desktop computer. In a step 1912, the intercepted save operation, along with pertinent information, is forwarded to the policy engine. In a step 1916, at least one policy including a save policy is evaluated. The save operation is allowed. In a step 1920, policy enforcer determines if the document should be encrypted. If the document should not to be encrypted, in a step 1924, the unencrypted new document is saved to the server.

If the document should be encrypted, in a step 1928, the document is encrypted using a shared encryption key obtained from the policy enforcer. This encryption is done on the local computer. In a step 1932, the newly encrypted document is saved at the file server location and only encrypted data is transmitted over the network.

Figure 20:
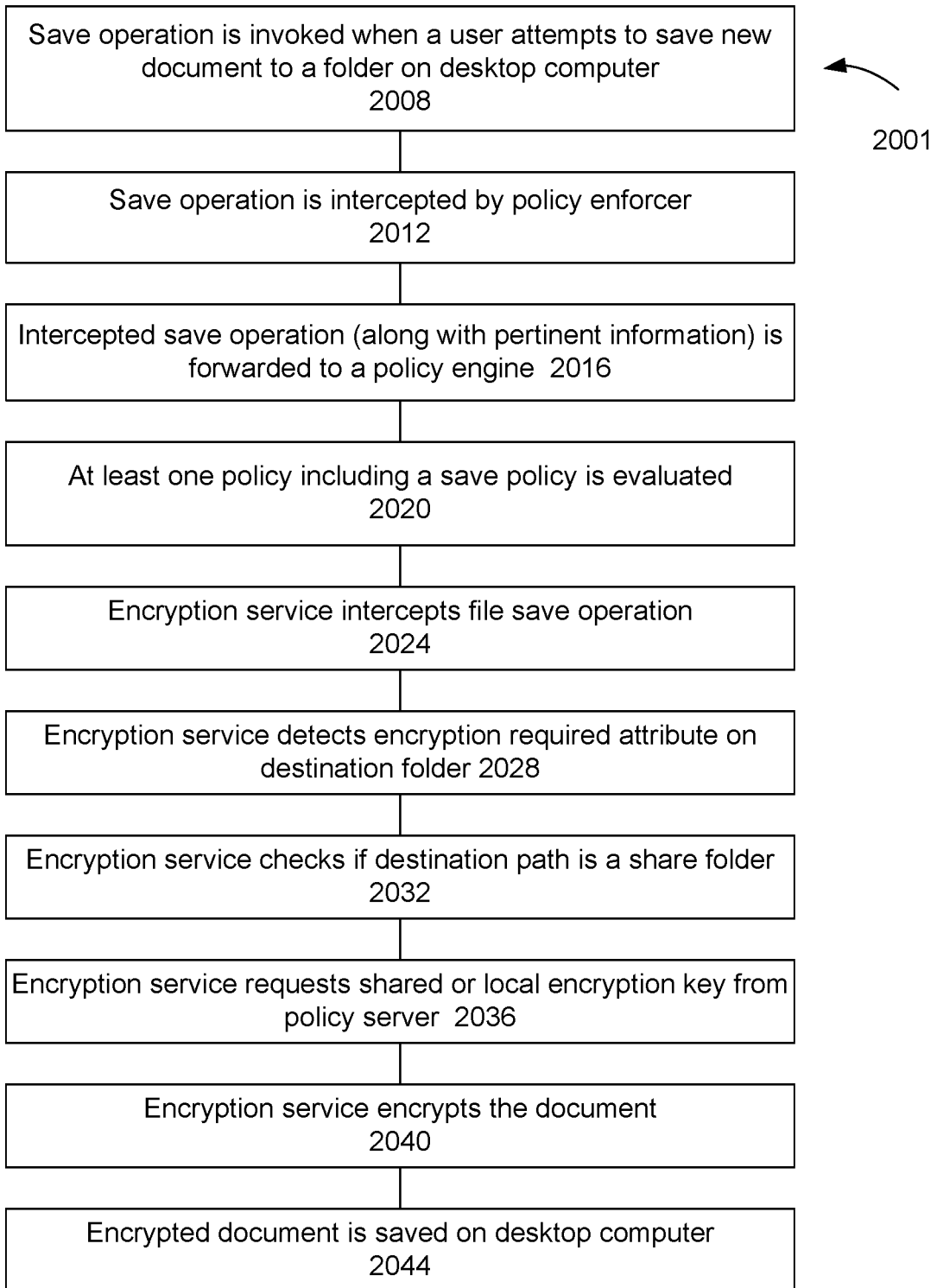
FIG. 20 shows a flow for encrypting a new document to be saved in a shared folder using a shared encryption key at an endpoint.

In an example, a new document is saved to a hard disk of a desktop computer where the directory to which the new document will be saved is shared and encrypted required attribute is set. FIG. 20 shows a flow 2001 for encrypting a new document to be saved in a shared folder using a shared encryption key at the desktop computer. In a step 2008, a save operation is invoked when a user attempts to save a new document to a folder on a desktop computer. In a step 2012, the save operation is intercepted by a policy enforcer on the desktop computer. In a step 2016, the intercepted save operation, along with pertinent information, is forwarded to the policy engine. In a step 2020, at least one policy including a save policy is evaluated. The save operation is allowed. In a step 2024, an encryption service intercepts the save operation. In a step 2028, the encryption service detects encryption required attribute on destination folder. The encryption required attribute specifies that all files created in the destination folder should be encrypted. In a step 2032, the encryption service determines if the destination folder a shared folder. In a step 1236, the encryption service requests a key from the policy enforcer. Depending on result from step 2032, if the result indicates the destination folder is a shared folder, the encryption service requests a shared encryption key from the policy enforcer. If the result indicates the destination folder is not a shared folder, the encryption service requests a local encryption key from the policy enforcer. In a step 2040, the encryption service encrypts the document using the encryption key obtained from the policy enforcer. The encryption may be a shared encryption key or location encryption key depending on the request made in step 1236. In a step 2044, the newly encrypted document is saved on the hard disk of the endpoint (e.g., desktop computer)

Figure 21:
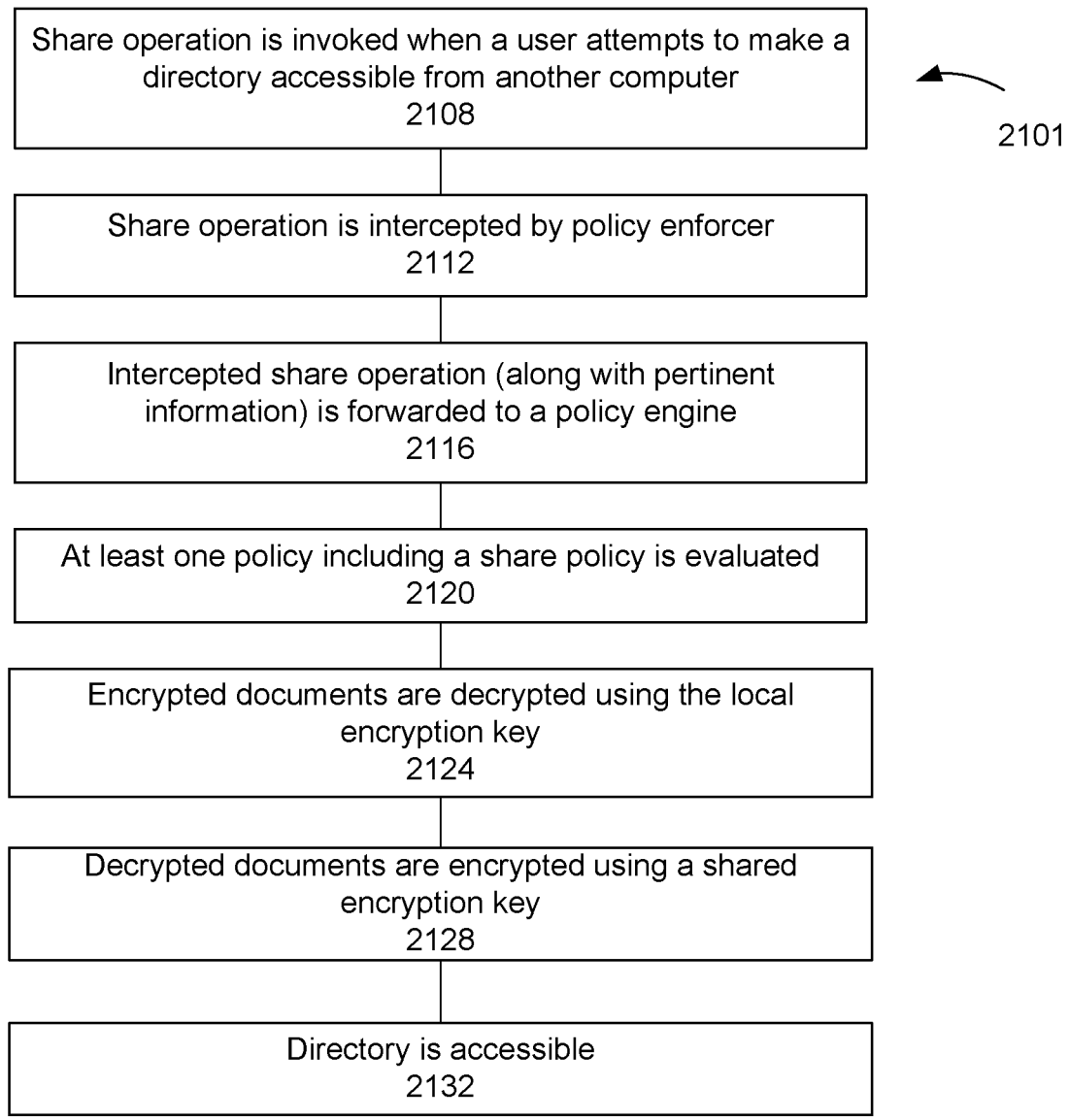
FIG. 21 shows a flow for sharing a folder at an endpoint.

In an example, a directory (or folder) on a desktop computer is being shared and the directory contains documents that are encrypted using a local encryption key. FIG. 21 shows a flow 2101 for sharing a folder on a local computer. In a step 2108, a share directory operation is invoked when a user attempts to make a directory accessible from another computer. The directory contains a plurality of documents encrypted using a local encryption key. In a step 2112, the share directory operation is intercepted by a policy enforcer on the desktop computer. In a step 2116, the intercepted share operation, along with pertinent information, is forwarded to the policy engine. In a step 2120, at least one policy including a share policy is evaluated. The share operation is allowed.

In a step 2124, the documents in the directory are decrypted using the local encryption key. In a step 2128, the decrypted documents are encrypted using a shared encryption key. In a step 2132, the newly encrypted documents in the directory are shared. For example, the desktop computer may access the documents encrypted in the shared directory by using the shared encryption key. Also, a second desktop computer may access the documents encrypted in the shared directory by using the shared encryption key.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use.

The invention claimed is:

1. A method comprising:
providing a document management system managing a plurality of documents wherein the document management system comprises clients and servers;
at a first client, executing a first interceptor code component;
at the first client, intercepting by the first interceptor code component a transfer request by an application, the transfer request executed at the first client, to perform a transfer of a document, managed by the document management system, to a second client;

by the first interceptor code component, transferring handling of the intercepted transfer request to a first policy enforcer program;
using the first policy enforcer program, evaluating at least one policy associated with the document;
as a result of the evaluating, determining that the transfer request is allowed, but before allowing the application to perform the transfer of the document, encrypting the document;
allowing the application to transfer the encrypted document to the second client;
receiving the encrypted document at the second client;
at a second interceptor code component, detecting an attempt to open the encrypted document at the second client;
by the second interceptor code component, transferring handling of the detected attempt to open request to a second policy enforcer program;
at the second policy enforcer program, evaluating at least one policy associated with the encrypted document;
as a result of the evaluating, determining that the open operation is allowed;
at an encryption module executing on the second client, determining the encrypted document is encrypted;
at an encryption module, attempting to obtain a key for the encrypted document by sending a key request to the second policy enforcer program including information comprising a process identifier;
at the encryption service, identifying the application program attempting to access the encrypted document at the second client;
from the encryption service, sending identification information on the application program to a policy enforcer component, executing on the computing device;
controlling access to unencrypted content based on the first policy comprising:
identifying a first application process identifier assigned by an operating system executing on the computing device for the application program, wherein the application program is attempting access to the encrypted document;
receiving a decryption key based on the first application process identifier at the encryption service;
using the encryption service to decrypt the encrypted document to produce the unencrypted content;
providing the unencrypted content to the application program; and
allowing a first system level operation to execute.

2. The method of claim 1 comprising:
at the second policy enforcer program, receiving the key request from the encryption module and evaluating the request based on the information comprising a process identifier; and
when the process identifier matches a previously saved process identifier, at the second policy enforcer program, sending a request to a key server of the document management system.

3. The method of claim 1 comprising:
after receiving a key at the second client, passing the key to the encryption module; and
at the encryption module, using the received key in unencrypting of the encrypted document to obtain the unencrypted document.

4. The method of claim 1 wherein the at the first policy enforcer program, evaluating at least one policy associated with the document comprises selecting the at least one policy from a plurality of policies.

5. The method of claim 1 wherein the key for the encrypted document is a shared key.

6. The method of claim 1 wherein the encrypting the document comprises:
accessing a shared encryption key ring at the first policy enforcer program, wherein the first shared key ring is accessible to the second policy enforcer program;
selecting a first encryption key of the shared encryption key ring; and
encrypting the document with the first encryption key.

7. The method of claim 6 wherein the shared encryption key ring is stored at a key management server.

8. The method of claim 7 wherein the evaluated at least one policy at the second policy enforcer program comprises a key ring identifier.

9. The method of claim 8 wherein the at least one policy at the first client is stored separately from the key management server.

10. The method of claim 1 wherein the at least one policy at the second client comprises an encryption key identifier.

11. The method of claim 1 wherein the determining that the transfer request is allowed, but before allowing the application to transfer the document, encrypting the document further comprises:
removing the document from a storage location for transfer; and
replacing the encrypted document in the storage location for transfer.

12. The method of claim 11 wherein the replacing the encrypted document in the storage location for transfer comprises also storing at the storage location for transfer the first policy enforcer program.

13. The method of claim 1 wherein the at least one policy evaluated at the second policy enforcer is different than the at least one policy evaluated at the first policy enforcer.

14. The method of claim 1 wherein the document is associated with a first file extension and the encrypted document is associated with a second document extension, different than the first document extension.

15. The method of claim 1 further comprising:
as a result of the evaluating, determining that the transfer request is denied; and
when the transfer request is denied, preventing the transfer by the first policy enforcer program.

16. The method of claim 1 wherein the document is unencrypted before being encrypted.

17. The method of claim 1 wherein the document is encrypted by a first client encryption module executing on the first client, and the first client encryption module is separate from the first interceptor code component.

18. The method of claim 1 wherein the at least one policy associated with the document is stored at the first client.

* * * * *